(12) United States Patent
Kim et al.

(10) Patent No.: US 9,552,138 B2
(45) Date of Patent: Jan. 24, 2017

(54) MOBILE TERMINAL AND METHOD FOR CONTROLLING THE SAME

(71) Applicant: LG ELECTRONICS INC., Seoul (KR)

(72) Inventors: Moonjung Kim, Seoul (KR); Hoonju Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 14/256,074

(22) Filed: Apr. 18, 2014

(65) Prior Publication Data

US 2014/0337790 A1    Nov. 13, 2014

(30) Foreign Application Priority Data

May 10, 2013  (KR) .................. 10-2013-0052836
Jul. 25, 2013  (KR) .................. 10-2013-0088041

(51) Int. Cl.
| | | |
|---|---|---|
| *G06F 3/048* | (2013.01) | |
| *G06F 3/0482* | (2013.01) | |
| *G06F 3/0481* | (2013.01) | |
| *G06F 3/0484* | (2013.01) | |
| *G06F 3/0488* | (2013.01) | |
| *G06F 3/01* | (2006.01) | |

(52) U.S. Cl.
CPC ......... *G06F 3/0482* (2013.01); *G06F 3/04817* (2013.01); *G06F 3/04842* (2013.01); *G06F 3/04883* (2013.01); *G06F 3/04886* (2013.01)

(58) Field of Classification Search
CPC ................ G06F 3/0482; G06F 3/04842; G06F 17/30864; G06F 17/30882
See application file for complete search history.

(56) References Cited

U.S. PATENT DOCUMENTS

| | | | | |
|---|---|---|---|---|
| 5,862,321 A * | 1/1999 | Lamming | ........... | G06F 15/0225 358/403 |
| 6,023,701 A * | 2/2000 | Malik | ........... | G06F 17/30882 |
| 6,560,640 B2 * | 5/2003 | Smethers | ........... | H04L 29/06 709/219 |
| 6,857,102 B1 * | 2/2005 | Bickmore | ........... | G06F 17/2247 707/E17.121 |
| 7,035,909 B1 * | 4/2006 | Lee | ........... | H04M 1/72561 709/217 |
| 2011/0029547 A1 * | 2/2011 | Jeong | ........... | G06F 3/0482 707/758 |

* cited by examiner

*Primary Examiner* — Nicholas Augustine
(74) *Attorney, Agent, or Firm* — KED & Associates, LLP

(57) ABSTRACT

A mobile terminal and a control method thereof are provided. When a pre-set input with respect to an object is received, the mobile terminal selects the object, and searches and displays at least one application associated with the selected object, and when an input with respect to a specific application, among the at least one application, is received, the mobile terminal converts the selected object into an applicable form corresponding to the specific application and displays the converted object.

19 Claims, 60 Drawing Sheets

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0052836, filed on 10 May 2013, and Korean Patent Application No. 10-2013-0088041, filed on 25 Jul. 2013 the contents of which are incorporated by reference herein in their entirety.

BACKGROUND

1. Field

The present disclosure relates to a mobile terminal providing a behavior guide of a user related to an object and a control method thereof.

2. Background

As functions are diversified, terminals such as a personal computer, a notebook computer, a mobile phone, or the like, are implemented as multimedia players having various functions such as capturing images and video, playing music or video files, playing games, receiving broadcast, and the like.

Terminals may be classified into mobile terminals and stationary terminals. Mobile terminals may be classified into handheld terminals and vehicle mount terminals according to whether users may directly carry it around.

Efforts are ongoing to support and increase functionality of terminals. The efforts include software and hardware improvements, as well as changes and improvements in structural components that form the mobile terminal.

Recently, various terminals, including mobile terminals, supporting complex and various functions, tend to link a plurality of applications to use execution results.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Figure 1:
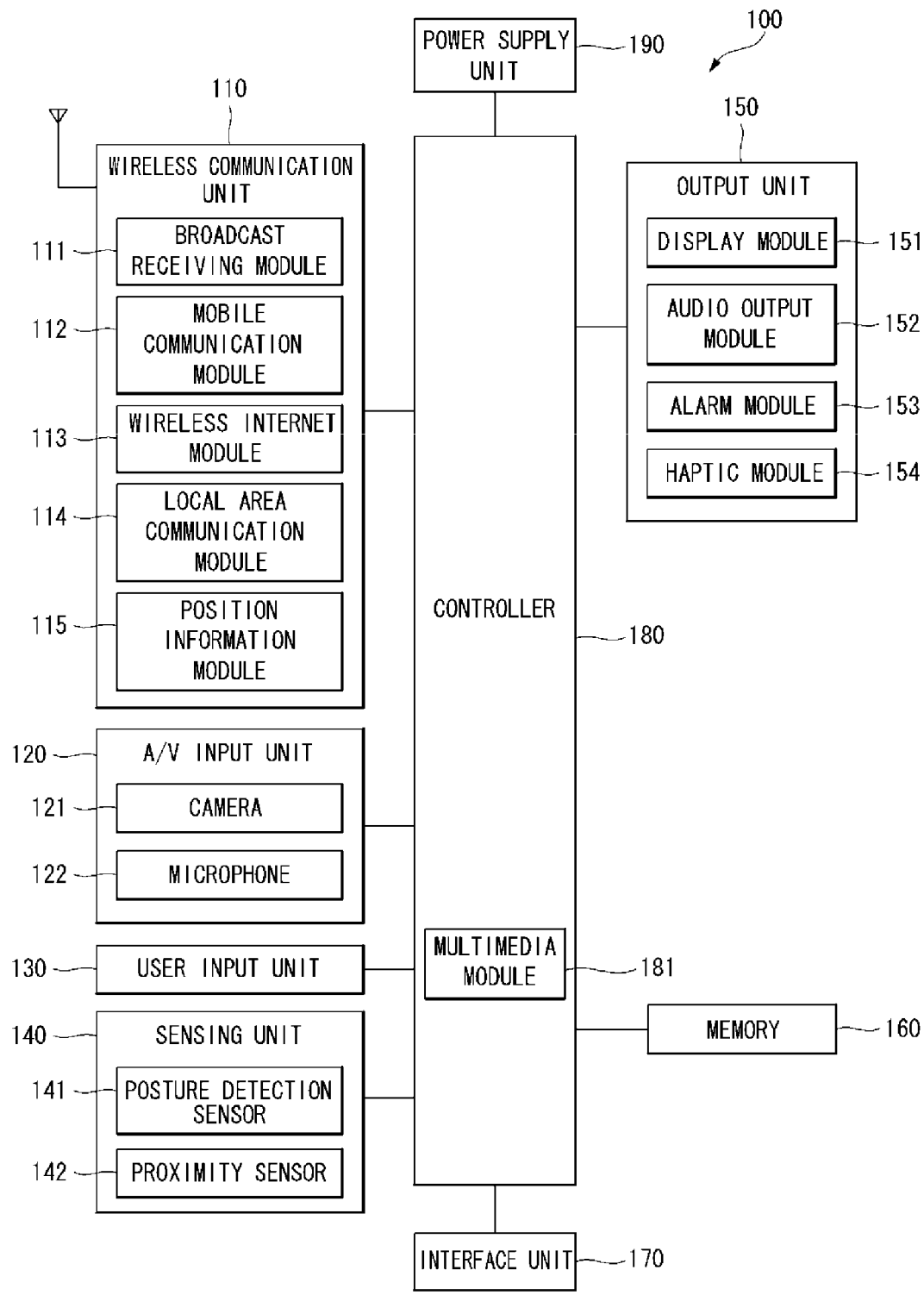
FIG. 1 is a block diagram of a mobile terminal according to an embodiment.

Various aspects, features and advantages of the present disclosure will be more apparent from the following detailed description taken in conjunction with the accompanying drawings. As the disclosure allows for various changes and numerous embodiments, a particular embodiment will be illustrated in the drawings and described in detail in the written description. Like reference numerals refer to like elements throughout the specification. In describing the present disclosure, detailed descriptions of well-known functions or configurations will be omitted in order to not necessarily obscure the subject matter of the present disclosure. Numerals (e.g., first, second, etc.) used in the description of the present disclosure are only for distinguishing one element from another element.

A mobile terminal according to the present disclosure may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on. It should be apparent to those skilled in the art that a configuration according to an embodiment disclosed in this specification should be applicable to fixed or stationary terminals, such as a digital TV or a desktop computer, except for applications disclosed to be specific only to a mobile terminal.

A further description may be provided with regard to a mobile terminal, although such teachings may apply equally to other types of terminals.

An aspect of the present disclosure is to provide a mobile terminal capable of recommending an application related to a selected object and providing a behavior guide for using a particular application by using the selected object in advance, and a control method thereof.

Another aspect of the present disclosure is to provide a mobile terminal capable of automatically converting an object into an applicable form corresponding to an input item of a specific application, and displaying the same in each input item, and a control method thereof.

According to an aspect of the present disclosure, a mobile terminal may include: a touch screen; and a controller configured to select the object upon receiving a pre-set input with respect to an object displayed on the touch screen, display at least one application associated with the selected object, convert the selected object into an applicable form corresponding to a specific application upon receiving an input with respect to the specific application, among the at least one application, and display the specific application and the converted object near the displayed object.

When an object is selected, the controller may display a specific indicator or a specific menu, and when the specific indicator or the specified menu is selected, the controller may display at least one application associated with the selected object.

When the input with respect to the specific application is released and an input with respect to a different application is received, the controller may reconvert an object selected in an applicable form corresponding to the different application and display the reconverted object in a display region of the converted object.

The pre-set input may include a touch input or drag applied to the displayed object, a long-touch input applied to the region including the displayed object, and a continuous touch input forming a curve surrounding the displayed object, and the touch or drag input may include a direct touch input or a proximity touch input applied to the touch screen.

The controller may convert the selected object into a form appropriate for each input item of the specific application.

When an execution input with respect to the specific application is received, the controller may display an executed screen of the specific application as a floating window in an upper portion of the region displaying the selected object in an overlapping manner.

When an executed input with respect to the specific application is received, the controller may display an executed screen of the specific application on the entire screen.

The displayed object may include text or an image, and when the displayed object is an image, the selected object may include an image and meta data with respect to the image.

When an input with respect to the converted object is received, the controller may switch the mobile terminal to an editing mode of the converted object.

The controller may display at least one application and the converted object as pop-up windows or may display the at least one application and the converted object as screens sliding from one side to the other side of the touch screen.

The controller may include an application selected by a user in at least one application.

The controller may classify the selected object into information regarding time, venue, name, contact number, number, date, and a specific word, and recommend an associated application by using the classified information.

When the converted object exceeds a pre-set reference, the controller may reconvert the converted object exceeding the reference into an applicable form corresponding to the specific application.

The controller may display a behavior guide related to the specific application and the converted object.

According to another aspect of the present disclosure, a mobile terminal may include: a touch screen; and a controller configured to receive a pre-set input with respect to text displayed in an input item of a specific application through the touch screen, compare the number of words of the text displayed in an input item of the specific application with a pre-set number of words, divide the text displayed in the input item into applicable form corresponding to at least one of other input items, when the number of words of the text displayed in the input item exceeds the pre-set number of words, and relocate the divided text to each of the other input items.

The controller may divide the text displayed in the one input item into time, date, venue, name, contact number, and a title, and relocate the divided text to the corresponding input item to display the same therein.

According to another aspect of the present disclosure, a control method of a mobile terminal may include: displaying an object on a touch screen; selecting the displayed object upon receiving a pre-set input with respect to the displayed object; displaying at least one application associated with the selected object; converting the selected object into an applicable form corresponding to a specific application upon receiving an input with respect to the specific application among the at least one application; and displaying the specific application and the converted object near the displayed object.

According to another aspect of the present disclosure, a control method of a mobile terminal may include: receiving a pre-set input with respect to text displayed in an input item of a specific application through a touch screen; comparing the number of words of the text displayed in the input item of the specific application with a pre-set number of words; when the number of words of the text display in the input item exceeds the pre-set number of words, dividing the text displayed in the input item into an applicable form corresponding to at least one of other input items; and relocating the divided text to each of the other input items.

Specific matters of other embodiments are included in detailed description and drawings.

The mobile terminal and the control method according to embodiments of the present disclosure have the following advantages.

According to an embodiment of the present disclosure, since an application related to a selected object and a behavior guide are provided as pop-up windows or sliding screens, a required application may be immediately selected and executed without having to close a screen being currently edited.

Also, according to an embodiment of the present disclosure, since a selected object is converted into an applicable form corresponding to a selected application and provided, a user does not need to directly input an input item of an application and may edit the provided from to use it.

Also, according to an embodiment of the present disclosure, although the user does not discriminately input an input item, text included in the input item may be automatically divided into a form applicable to each input item so as to be relocated to each item, enhancing user convenience.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a location information module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The location information module 115 may identify or otherwise obtain a location of the mobile terminal 100. The location information module 115 may be provided using global positioning system (GPS) components that cooperate with associated satellites, network components, and/or combinations thereof.

The location information module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The location information module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141, a motion detecting sensor 142, a brightness detecting sensor 143, a distance detecting sensor 144, and/or a heat detecting sensor 145. Details of the proximity sensor 141 and the other sensors 142, 143, 144 and 145 may be explained below.

The motion detecting sensor 142 may detect a motion state of the mobile terminal 100 by an external force such as an external shock, an external vibration and/or the like. The motion detecting sensor 142 may detect a motion extent. The motion detecting sensor 142 may be provided with a rotational body and detect a motion of the terminal by detecting a property of a mechanical movement of the rotational body. Based on speed, acceleration and direction of the motion, the motion detecting sensor 142 may detect either the motion extent or a motion pattern and then output the detected one to the controller 180. The motion detecting sensor 142 may include a gyrosensor.

The brightness detecting sensor 143 may detect a brightness of light around the mobile terminal 100 and then output the detected brightness to the controller 180.

The distance detecting sensor 144 may include an ultrasonic sensor or the like. The distance detecting sensor 144 may measure a distance between the mobile terminal 100 and a user and then output the detected distance to the controller 180.

The heat detecting sensor 145 may be provided around the display 151 of the terminal body. The heat detecting sensor 145 may detect the temperature on user's contact with the terminal body and then output the detected temperature to the controller 180.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable.

For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2:
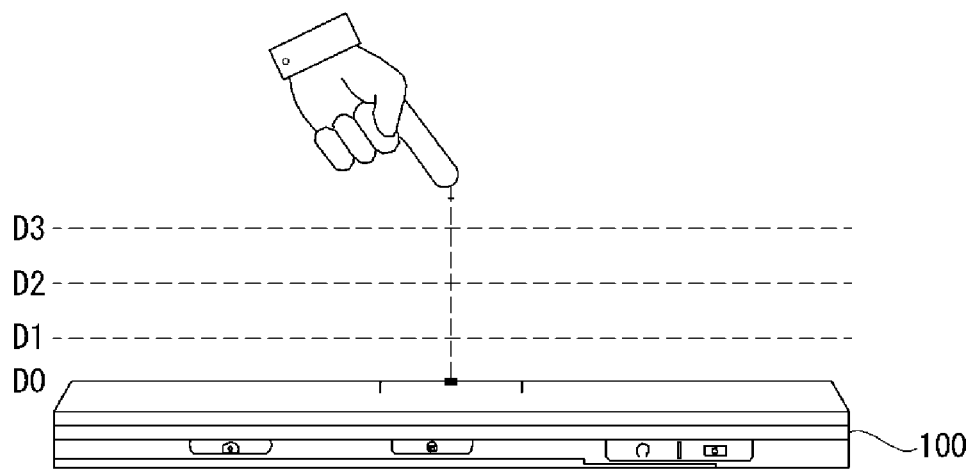
FIG. 2 is a diagram relating to a proximity depth of a proximity sensor.

FIG. 2 is a diagram relating to a proximity depth of a proximity sensor. Other embodiments, arrangements and configurations may also be used.

As shown in FIG. 2, when a pointer, such as a user's finger, a pen, a stylus and the like, approaches the touchscreen, the proximity sensor 141 provided within or in a vicinity of the touchscreen may detect the approach of the pointer and then output a proximity signal.

The proximity sensor 141 may output a different proximity signal according to a distance between the pointer and the proximity-touched touchscreen (hereafter referred to as a proximity depth).

FIG. 2 shows a cross-section of the touchscreen provided with a proximity sensor capable of detecting three proximity depths, for example. A proximity sensor that identifies less than 3 proximity depths or more than 4 proximity depths may also be provided.

If the pointer fully contacts the touchscreen (d0), a contact touch may be recognized. If pointer is spaced apart from the touchscreen by a distance less than d1, a proximity touch to a first proximity depth may be recognized. If the pointer is spaced apart from the touchscreen by a distance between d1 and d2, a proximity touch to a second proximity depth may be recognized. If the pointer is spaced apart from the touchscreen in a distance less than d3 or equal to or greater than d2, a proximity touch to a third proximity depth may be recognized. If the pointer is spaced apart from the touchscreen in a distance equal to or greater than d3, a proximity touch is released.

The controller 180 may recognize the proximity touch as one of various input signals according to proximity depth and position of the pointer. The controller 180 may perform various operation controls according to various input signals.

Hereinafter, embodiments of the present disclosure will be described.

Figure 3:
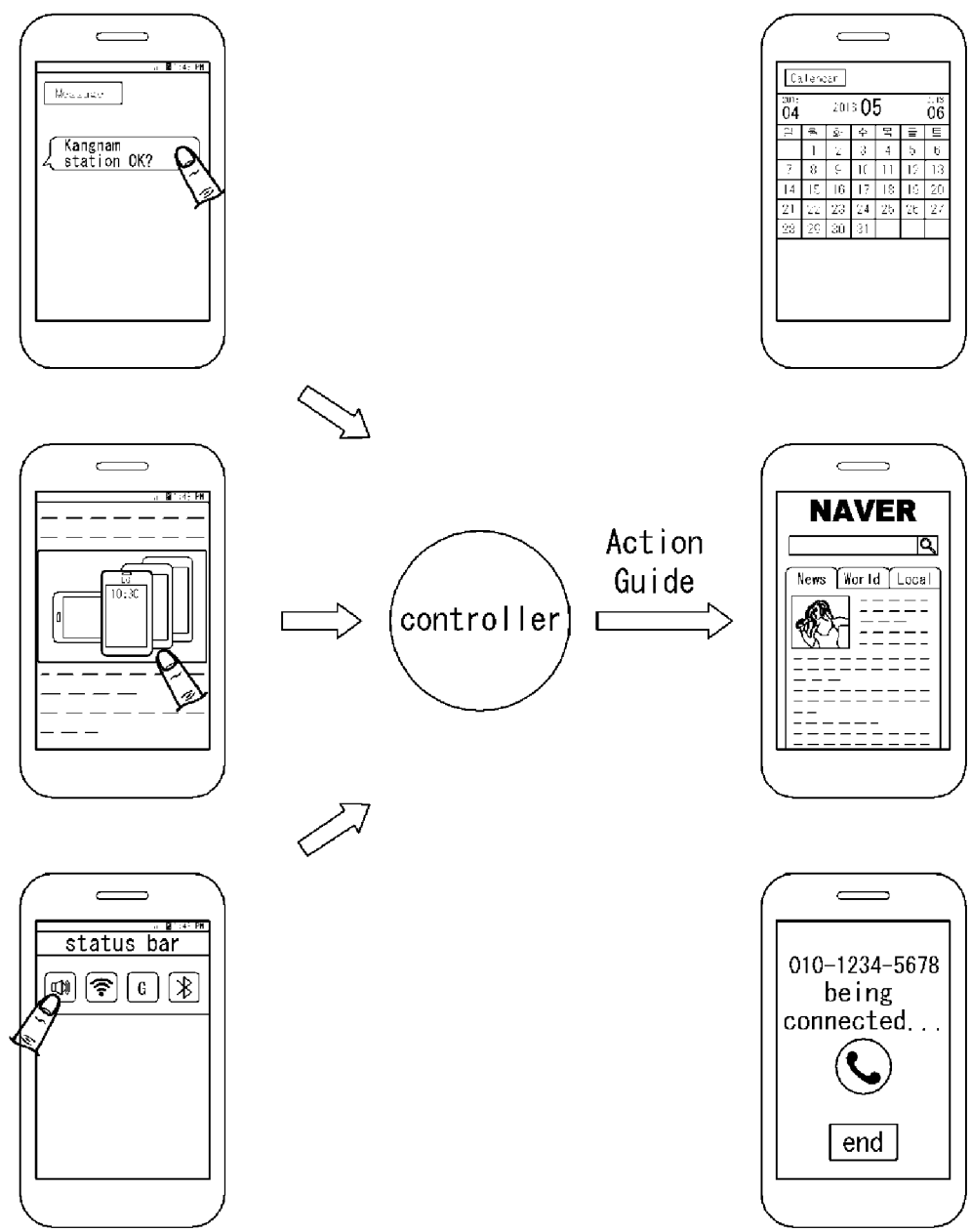
FIG. 3 is a view collectively illustrating a control method of a mobile terminal related to an embodiment of the present disclosure.

FIG. 3 is a view collectively illustrating a control method of a mobile terminal related to an embodiment of the present disclosure.

Referring to FIG. 3, text, an image, and sensed information displayed in a mobile terminal may be selected as an object, context of the selected object may be analyzed to recommend an associated application and provide a behavior guide for guiding a subsequent behavior of the user together. The object may include any subject or target that may be displayed on a touch screen and selected, as well as text or an image.

According to an embodiment, the mobile terminal may recommend an application associated with an object displayed on a screen that the user is currently editing, to provide a function of guiding a subsequent behavior of the user.

The controller (180 in FIG. 1) may display an application highly associated with the selected object, as a pop-up window or a sliding screen on the touch screen, and thus, the user may check the related application without having to close the screen being currently edited.

The controller 180 may analyze contents of the selected object and recommend a related application or a related function. As for contents analysis of the object, in a case in which the object is text, the controller 180 may parse specific text in units of word in consideration of part of speech such as postposition, verbs, or the like, classify the parsed words into time, venue, name, emotion, phone number, search word, and the like, and recommend a related application according to the classified items. Also, in a case in which the object is an image, the controller 180 may recommend a related application by using an image and meta data of the image.

The controller 180 may recommend the related application as a pop-up window or a sliding screen, and an icon, a widget, a title, or the like, of the recommended application may be displayed in the pop-up window or the sliding screen.

In a case in which a specific application, among the at least one recommended application, is executed, the controller 180 may display an executed screen of the specific application as an entire screen or a floating screen.

When at least one application is recommended, the controller 180 may determine recommendation order according to relevancy between the selected object and the application, selection frequency, and the like, and display the same.

The controller 180 may display all items corresponding to the recommended application in a first pop-up window or display only a pre-set number of items with high priority in the recommended application. When the recommended application cannot be entirely displayed in a designated region, the controller 180 may display a scroll or an indication for receiving a horizontal movement input to display the presence of additional items.

When the object is selected, the controller 180 may immediately display an associated application or display a specific indicator or a specific menu item in the selected object, and when an input selecting the specific indicator or the specific menu item is received, the controller 180 may display the associated application.

Figure 4:
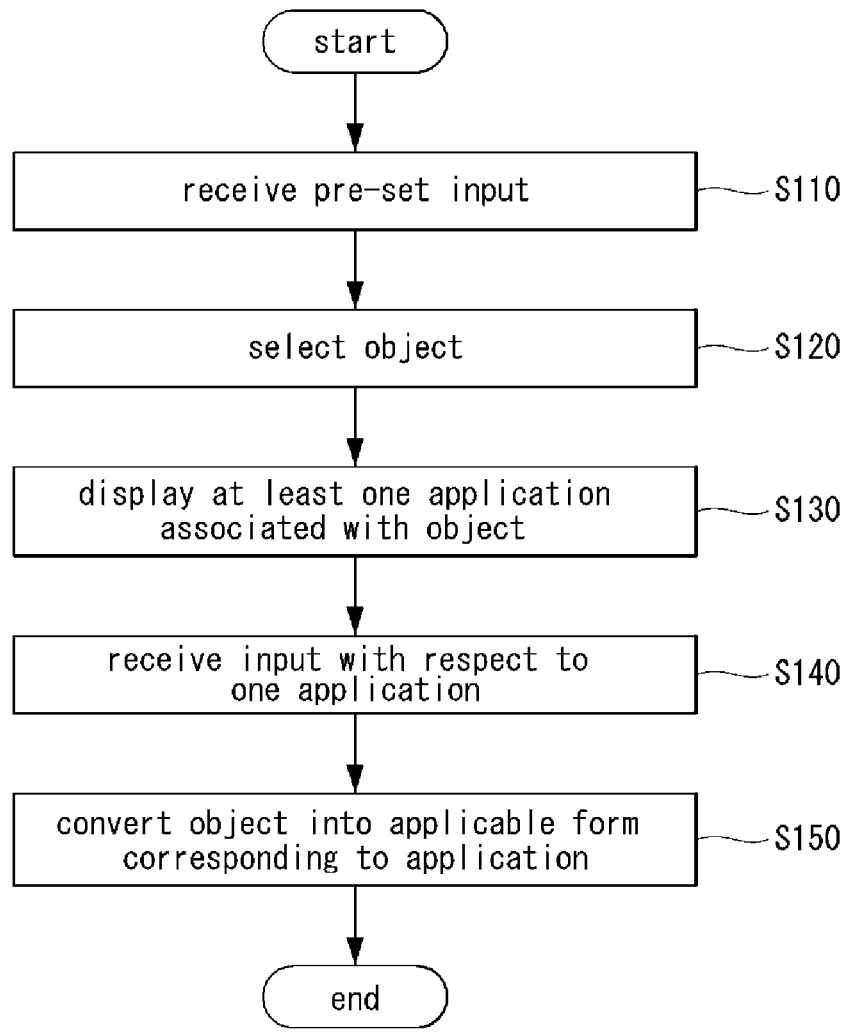
FIG. 4 is a flow chart of a control method of a mobile terminal related to an embodiment of the present disclosure.

FIG. 4 is a flow chart of a control method of a mobile terminal related to an embodiment of the present disclosure.

Referring to FIG. 4, when a pre-set input applied to an object displayed on the touch screen is received (S110), the controller 180 may select the object (S120).

The pre-set input may include a touch input or a drag input applied to the displayed object, a long touch input applied to a region including the displayed object, and a continuous touch input forming a curve surrounding the displayed object, and the touch or drag input may include a direct touch input or a proximity touch input applied to the touch screen.

The controller 180 may search at least one application associated with the selected object and display the same (S130). The controller 180 may classify the selected object into information regarding time, venue, name, contact number, number, date, and specific word, and recommend an associated application by using the classified information.

Here, in recommending at least one associated application, the controller 180 may provide an editing item for including a certain application desired by the user when the at least one associated application is recommended.

In a case in which an input with respect to a specific application is received (S140), the controller 180 may convert the selected object into an applicable form corresponding to the specific application and further display the converted object (S150).

In detail, the converted object refers to an object obtained by parsing and processing the selected object into a form applicable to an input item of the specific application. For example, in a case in which text "Grandmother will arrive at Seoul Station at 7:00 p.m. tomorrow" is selected and a calendar application is selected in the selected object, words "Grandmother arrive", "7:00 p.m. tomorrow", and "Seoul Station" indicating a title, a date, a location, and contents as input items of the calendar application are extracted and converted into objective words "Grandmother meet", "Jul. 19, 2013, Friday, 7:00 p.m.", and "Seoul Station" that may be determined by the mobile terminal so as to be displayed. The input item may be an input field, for example, a text input field or the like.

In a case in which an input applied to the converted object is received, the controller 180 may switch the mobile terminal to an editing mode of the converted object, and edit, such as delete, add, correct, merge, and the like, the converted object.

When an object is selected, the controller 180 may display a specific menu (hereinafter, referred to as a 'Smart Link'), and when the specific menu is selected, the controller 180 may display at least one application associated with the selected object. Namely, when the object is selected, the controller 180 may immediately display the associated application, and when an input applied to Smart Link is received after the object is selected, the controller 180 may display the associated application.

When an input with respect to the specific application is released and an input with respect to a different application is received, the controller 180 may reconvert the selected object into an applicable form corresponding to the different application and display the reconverted object in a display region of the converted object. In detail, the controller 180 may convert an applicable form of the object into a form appropriate for the selected specific application, for example, into a form corresponding to each input item of the specific application, and provide the same in advance.

In a case in which an execution input with respect to the specific application is received, the controller 180 may display an executed screen of the specific application in an upper portion of the region in which the selected object is displayed, as a flowing window in an overlapping manner.

In a case in which an execution input with respect to the specific application is received, the controller 180 may change the screen to display an executed screen of the specific application on the entire screen.

Also, in a case in which an execution input with respect to the specific application is received, the controller 180 may display an executed screen of the specific application as a floating window in an upper portion of the region displaying the selected object in an overlapping manner as a preview screen, and thereafter, when a specific input applied to the executed screen is received, the controller 180 may expandedly display the executed screen as an entire screen.

The controller 180 may display the at least one application and the converted object as pop-up windows or may display the at least one application and the converted object as screens sliding from one side of the touch screen to the other side thereof.

In a case in which the converted object exceeds a pre-set reference, the controller 180 may reconvert the converted object exceeding the reference into an applicable form corresponding to the specific application.

Hereinafter, a control method of the mobile terminal according to an embodiment of the present disclosure will be described in detail with reference to FIGS. 5 through 58.

FIGS. 5 through 25 are views illustrating a method of selecting an object in a mobile terminal related to an embodiment of the present disclosure.

Figure 5:
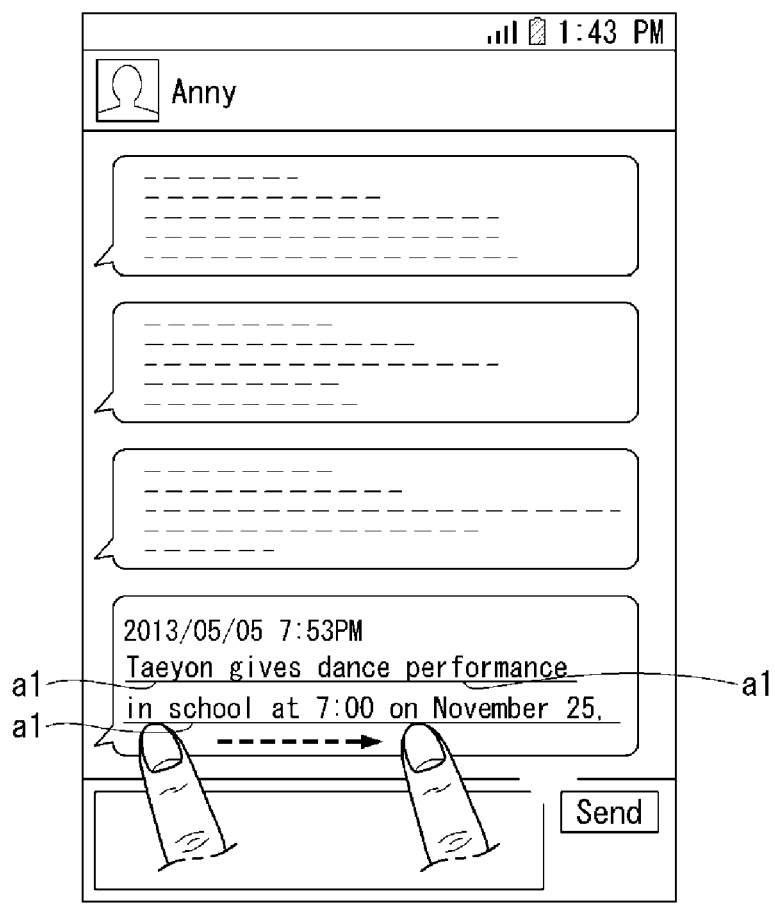
FIGS. 5 through 25 are views illustrating a method of selecting an object in a mobile terminal related to an embodiment of the present disclosure.

Referring to FIG. 5, in a case in which a drag input applied to text desired to be selected is received in a text message reception window, the controller 180 may select text displayed in the dragged region a1. For example, in a case in which the user receives a message of contents required for schedule registration, the user may drag required text from the corresponding message reception window to select it, and register the same to a calendar application. In this case, the user may drag only a region in which required words are displayed in the input item of the calendar application and select only a specific word as an object.

In detail, when a drag input applied to each region a1 in which "November 25, 7:00", "Tae-yeon", "Dance performance in school" is received in the message reception window, the controller 180 may select each text.

The controller 180 may display the selected object (text) such that it is discriminated from other objects. For example, the controller 180 may underline the selected text to display it, mark the selected text with a highlighter to display it, or display the selected text region such that its contrast is differentiated from other regions.

According to the embodiment of the present disclosure, discontinuous text may be selected at a time and used in a different application, and thus, the limitation of the related art in which discontinuous text cannot be used at a time when edited may be overcome.

Figure 6:
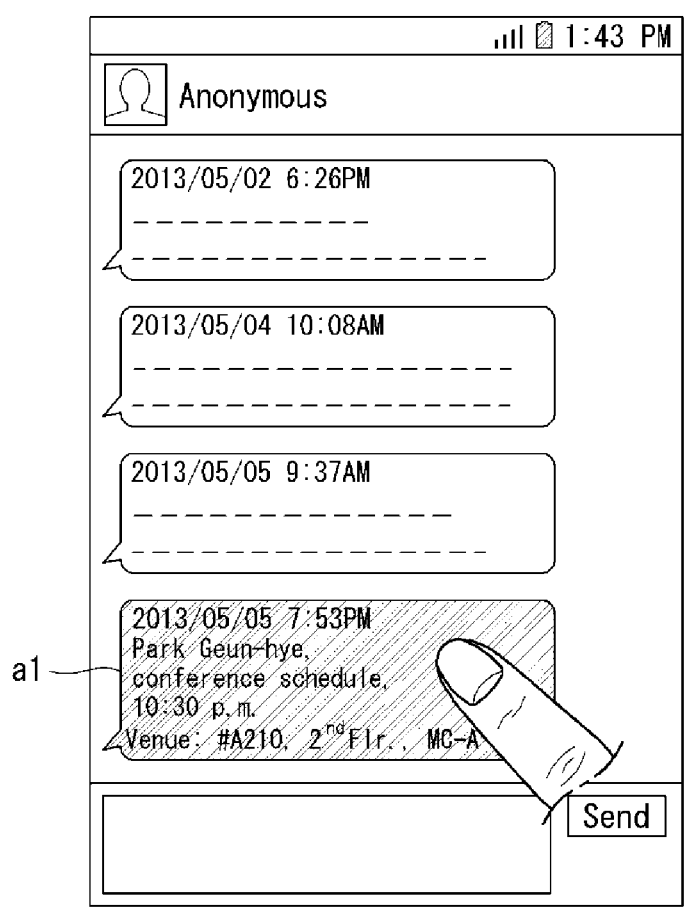

Referring to FIG. 6, in a case in which a long touch input applied to a certain region of the text message reception window is received, the controller 180 may select text included in the reception window a1 to which the long touch input has been applied.

The certain region refers to a region touched by the user in an internal region of the message reception window including an object desired to be selected.

In detail, in a case in which a long touch input applied to a certain region of the message reception window of a message received at May 5, 2013, 7:53 p.m., the controller 180 may select "2013/0505 7:53 p.m. Park Geun-hye, conference schedule 10:30 a.m. today venue: #A210, 2nd Flr., MC-A".

Similarly, the selected text may be displayed by changing display characteristics thereof such that it is discriminated from other objects, or display an indicator.

Figure 7:
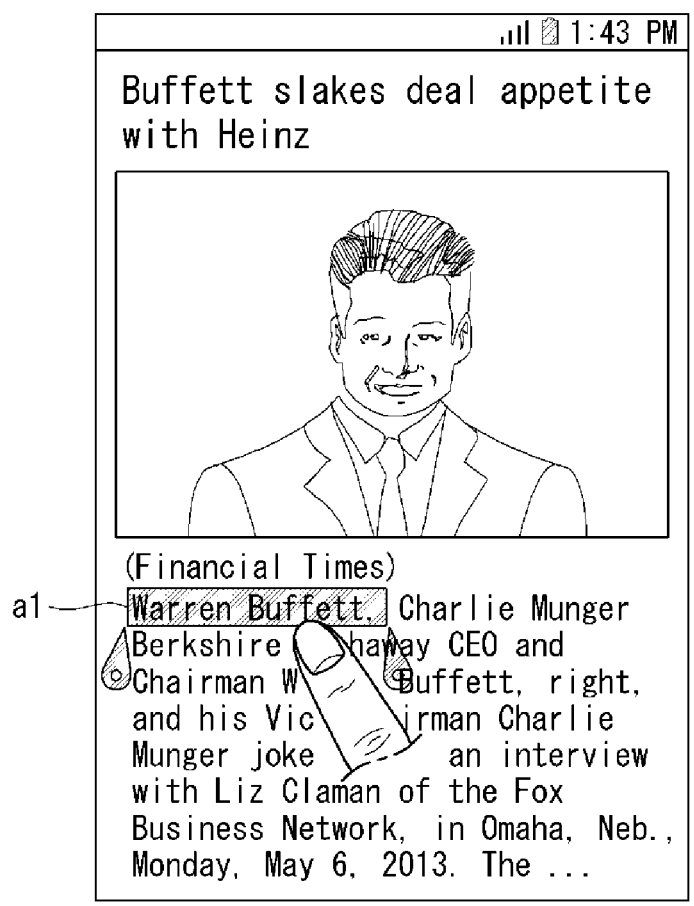

Referring to FIG. 7, in a case in which a touch input applied to specific text is received, the controller 180 may select the text in units of phrase and display an indicator for magnifying a selected region in both ends of the selected text region a1.

The controller 180 may move the indicator displayed in both ends of the selected text region s1 in an outward direction to magnify the text region to be selected.

In detail, in a case in which a touch input applied to "ff" of text "Buffet" in an object displayed in a Web page is received, the controller 180 may select a proper noun "Warren Buffet".

Figure 8:
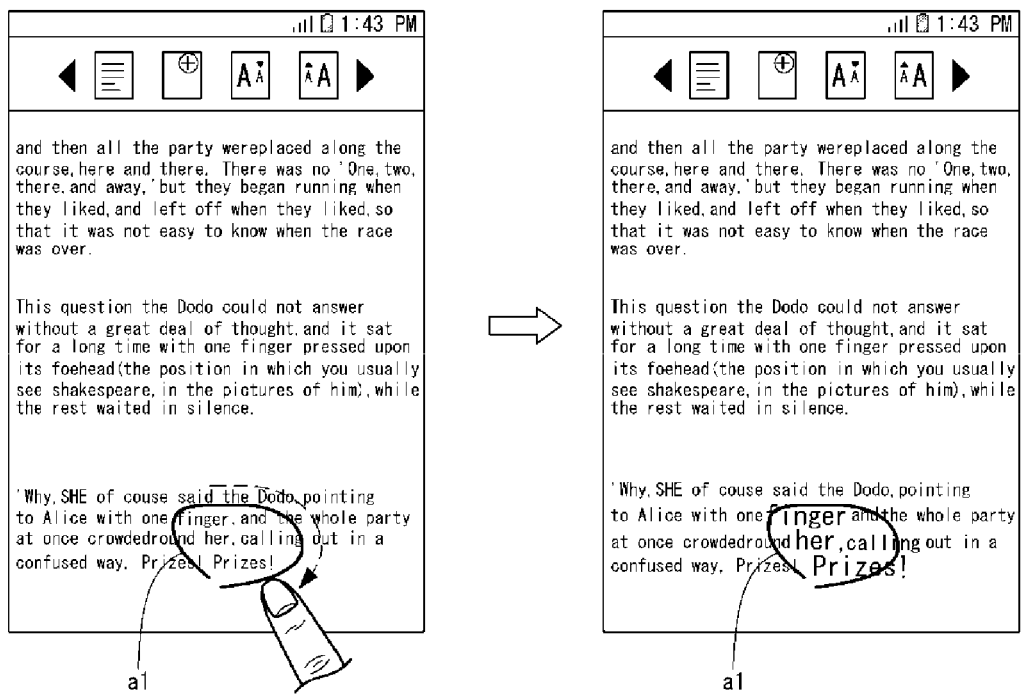

Referring to FIG. 8, in a case in which a curve surrounding specific text is input, the controller 180 may select a text region a1 included within the curve.

Here, the controller 180 may display the selected text such that is visually discriminated from other objects. For example, the controller 180 may magnify the size of the selected letters "Finger", "her", and "Prizes" or display the text in bold type.

Figure 9:
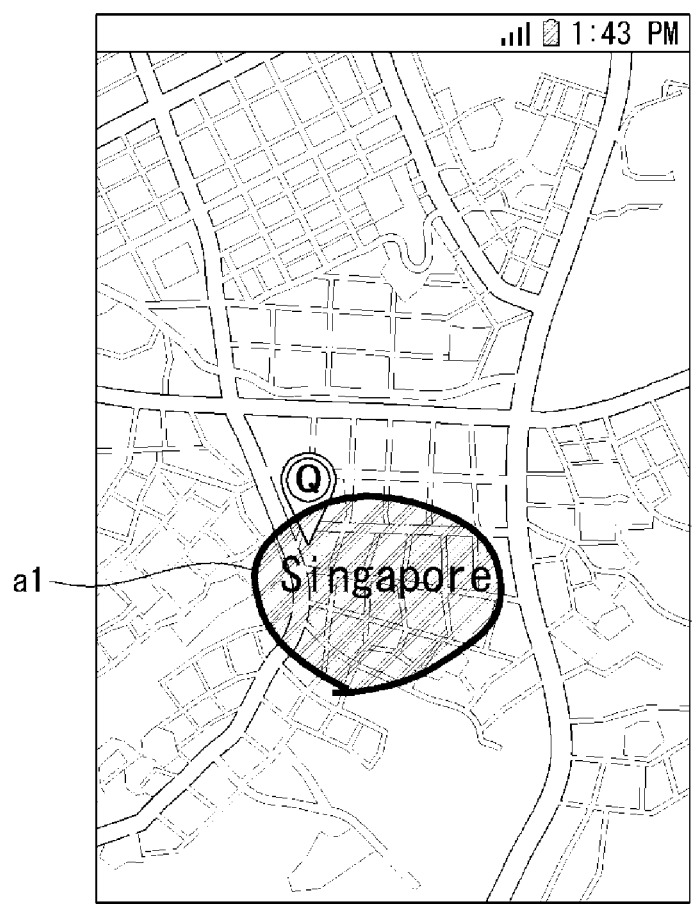

Referring to FIG. 9, in a case in which a curve surrounding text included in an image is input, the controller 180 may select a text region a1 surrounded by the curve.

In case in which a curve or a closed curve surrounding text is input, the controller 180 may discriminately specify the region surrounded by the curve or the closed curve and select text included in the specific region a1.

Here, the controller may set whether to include text crossing the closed curve in the specific text in advance. For example, in a case in which only a portion of a word is included within the closed curve, the controller 180 may not select the word crossing the closed curve, as specific text.

Also, the controller 180 may change the contrast of the region specified by the closed curve to display the specific region such that it is discriminated from other regions.

In detail, the controller 180 may discriminate a specific region with a closed curve, and select "Singapore" included in the specific region s1 as specific text.

Figure 10:
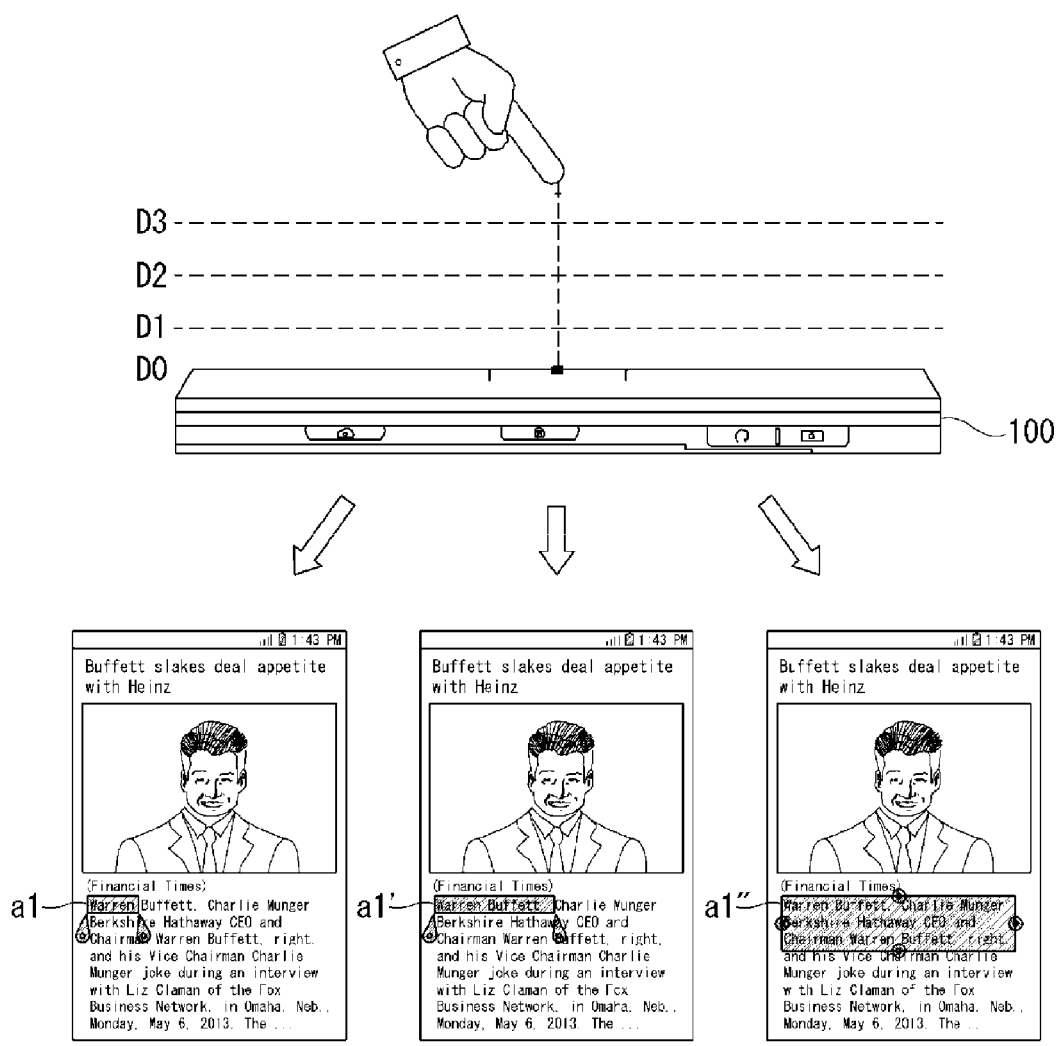

Referring to FIG. 10, the controller 180 may select an object based on a proximity touch applied to the touch screen, and selected regions a1 to a1" may be magnified according to a distance of the proximity touch.

In detail, the selected regions a1 to a1" may be changed in a case in which an upper distance D3 corresponding to "Warren" on the touch screen is touched, in a case in which a distance D2 is touched, and in a case in which a distance D1 is touched.

In the case in which the distance D3 is touched, the controller 180 may select "Warren (a1)", in a case in which the distance D2 is touched, the controller 180 may select "Warren Buffet (a1')", and in a case in which the distance D1 is touched, the controller 180 may select "Warreen Buffet, ~right (a1")".

Figure 11:
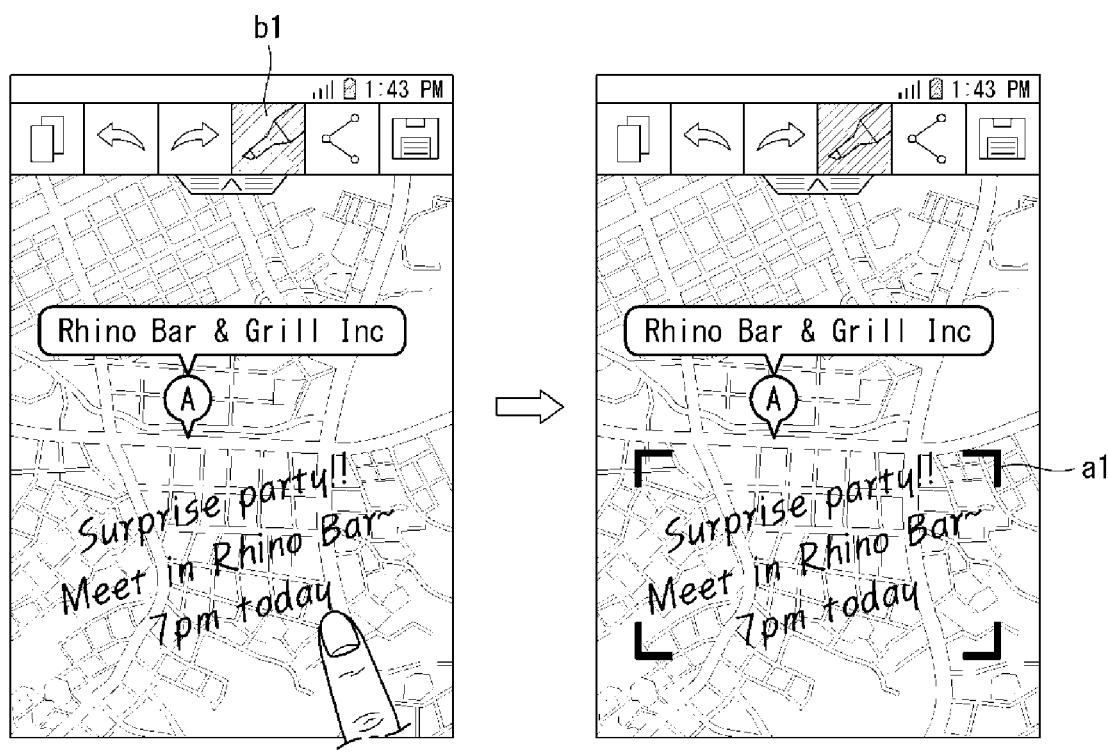

Referring to FIG. 11, in a case in which a memo application (for example, a quick memo, or the like) is executed and text is touch-input on an image, when the touch input applied to the text is completed and a pre-set time has lapsed, the controller may automatically determine the text input region and select the text region a1.

In detail, after the memo application is executed, when a touch is applied to "Surprise party!! Meet in Rhino Bar~7 pm today" on the map image and the touch is subsequently released, the controller 180 may automatically select the touch-input text region a1.

Figure 12:
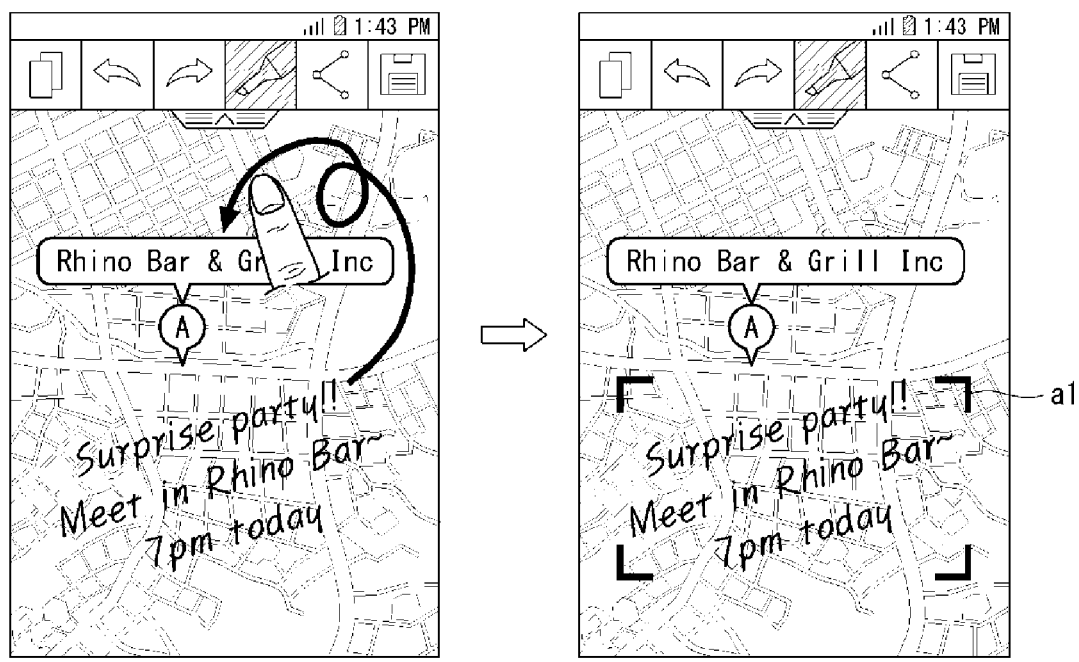

Referring to FIG. 12, in a case in which a memo application is executed and a touch is applied to a text on an image, when the touch input applied to the text is completed and a specific input is received, the controller 180 may select the text region a1.

In detail, in a case in which text "Surprise party!! Meet in Rhino Bar~7 pm today" is touch-input and an arrow connected to a specific point "Rhino Bar & Grill Inc" on the map is input, the controller 180 may select "Surprise party!! Meet in Rhino Bar~7 pm today".

Figure 13:
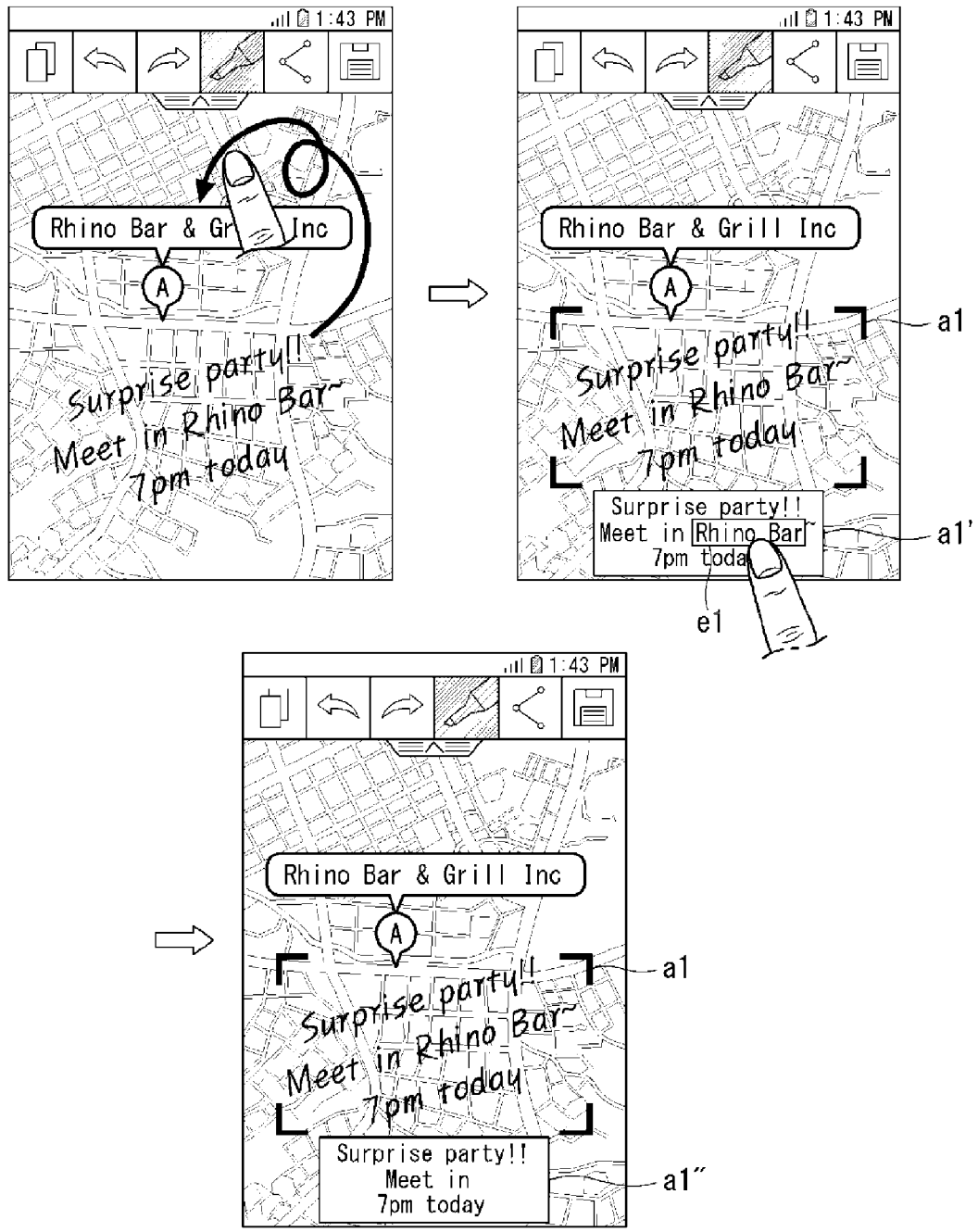

Referring to FIG. 13, when text is selected such that a memo application is executed and text is touch-input on an image, the controller 180 may edit such as add, correct, delete, or the like, a portion of the selected text.

In detail, after the text "Surprise party!! Meet in Rhino Bar~7 pm today" is touch-input, the arrow connected to the specific point "Rhino Bar & Grill Inc" on the map may be input to determine the object region a1 to be selected. After handwriting is completed, when an arrow input is received, the controller 180 may select the handwritten "Surprise party!! Meet in Rhino Bar~7 pm today".

In a case in which a touch, i.e., a long touch input, applied to the selected text region a1 is received, the controller 180 may display the selected text on an editing screen a1' and drag a partial region of the text displayed on the editing region a1 to select text e1 to be edited.

When selecting of the text e1 to be edited is completed, the controller 180 may display a menu such as copy, delete, correct, or the like, and when the delete menu with respect to text "Rhino Bar(e1)" to be edited is selected, the controller 180 may delete "Rhino Bar" and select "Surprise party!! Meet in Rhino Bar~7 pm today" displayed in an editing-completed region a1".

In case of the method of editing a portion of the selected object, even when an object in a different from is selected, an editing screen may be entered and a portion of a selected object may be deleted, added, or corrected to select a final object.

Figure 14:
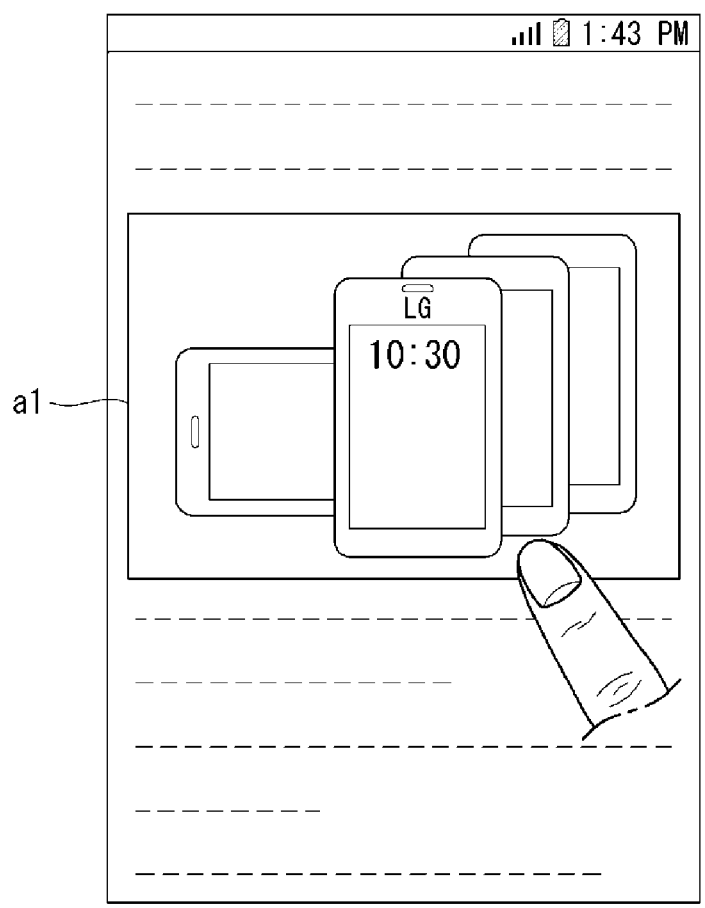

Referring to FIG. 14, when a long touch input applied to an image region a1 including text is received, the controller 180 may select an image.

In the case of selecting the image, the controller 180 may include the image and meta data with respect to the image in the selected object.

In detail, the controller may select, as well as an image, text "10:30" and "LG" displayed on the image and thumbnail, information "Color: Red, White, Black", "File Name: Electronics", and "1:1:1 Layout", as an object.

Figure 15:
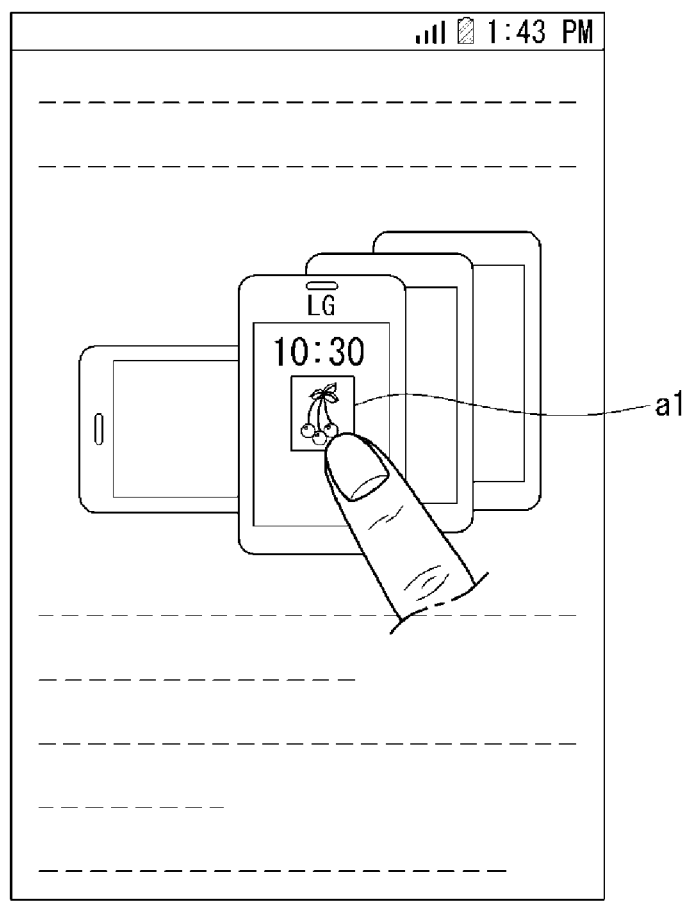
Figure 16:
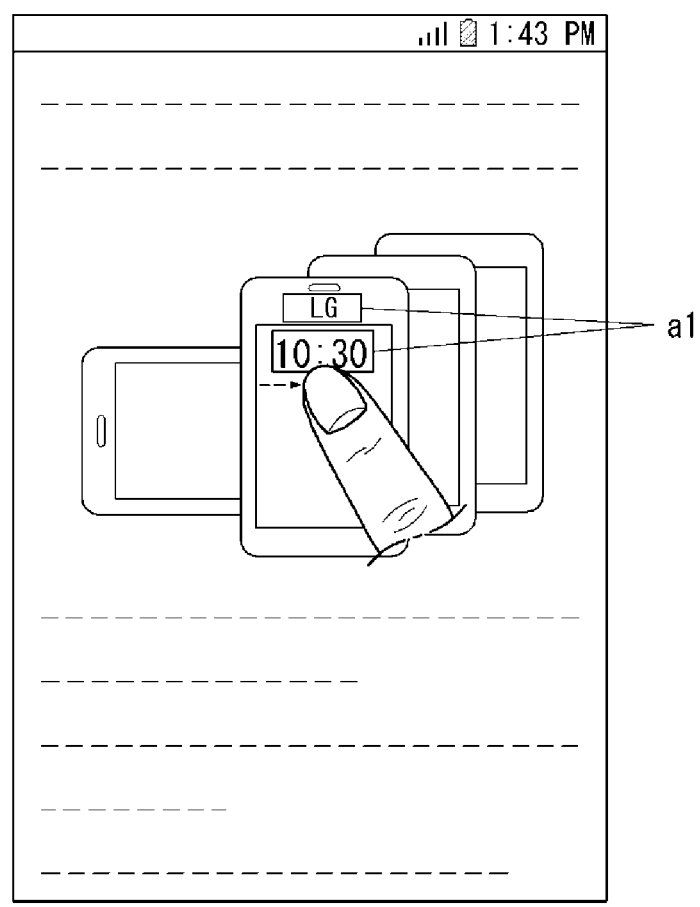

Referring to FIGS. 15 and 16, the controller 180 may select a symbol, a figure, a specific shape, or text constituting a portion of an image, as an object.

In detail, the controller 180 may select a specific object (e.g., plum (a1)) included in the image as an object or "LG" and "10:30(a1)" as an object.

Figure 17:
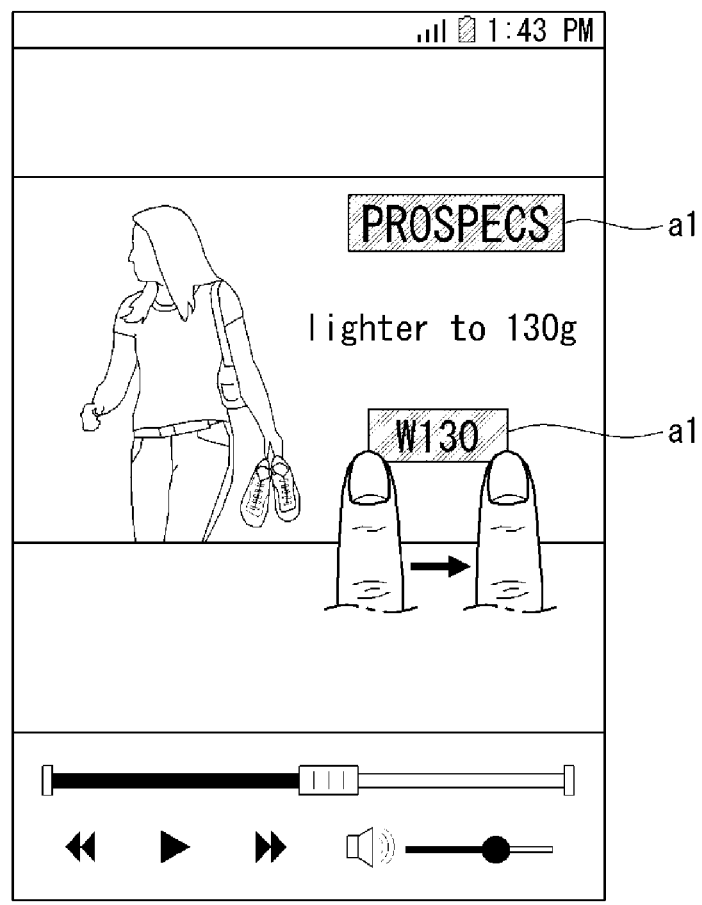

Referring to FIG. 17, in a case in which a drag input applied to a specific region a1 in which text included in stopped video is displayed is received, the controller 180 may select text included in the specific region a1 to which the drag input has been applied.

In a case in which video playing is temporarily stopped and a drag input applied an object displayed on the temporarily stopped screen is received, the controller 180 may display the selected window a1 in the region to which the drag input has been applied, and extract text included in the selected window by using an optical character reader (OCR).

In detail, in a case in which a drag input applied to a region in which "PROSPECS" and "W130" are displayed is received, the controller 180 may display the selected window a1 in the region to which the drag input has been applied, and select the text "PROSPECS" and "W130" included in the selected window.

Figure 18:
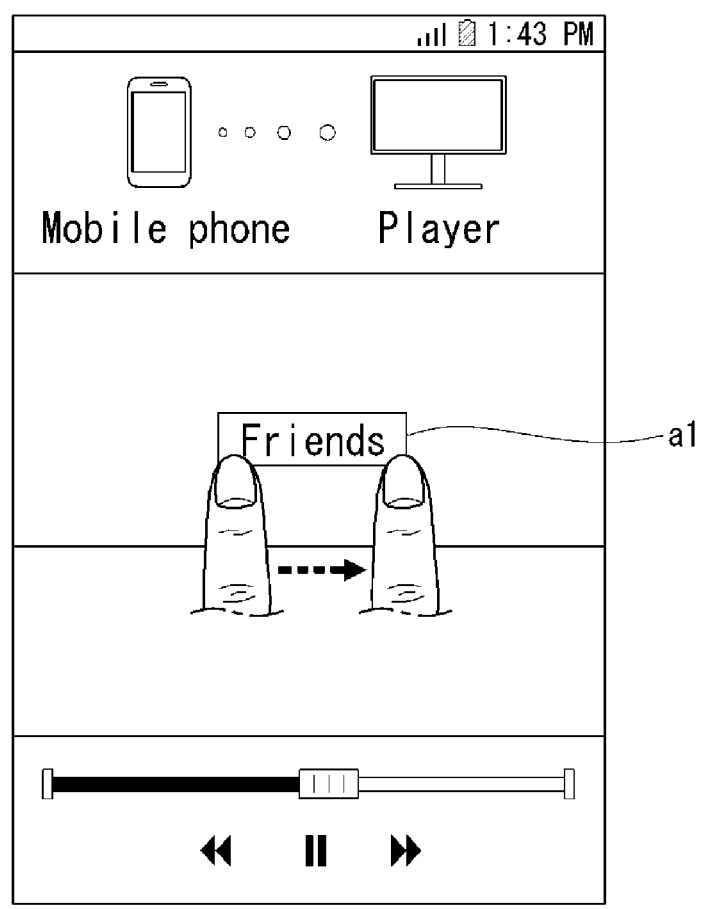

Referring to FIG. 18, when data is being shared with an external different device and a file is being transmitted to and from the external device, the controller 180 may temporarily stop the data sharing and file transmission and select an object displayed on the temporarily stopped screen.

In detail, in a case in which a drag input applied to text "Friends (a1)" displayed on a temporarily stopped screen is received, the controller 180 may select "Friends (a1)".

Figure 19:
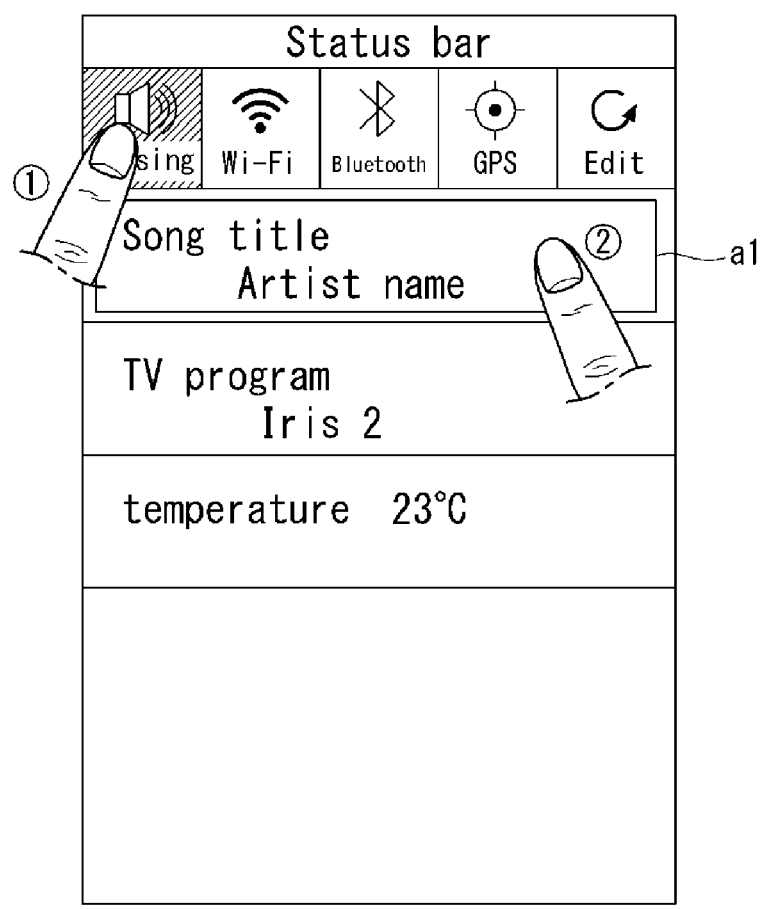
Figure 20:
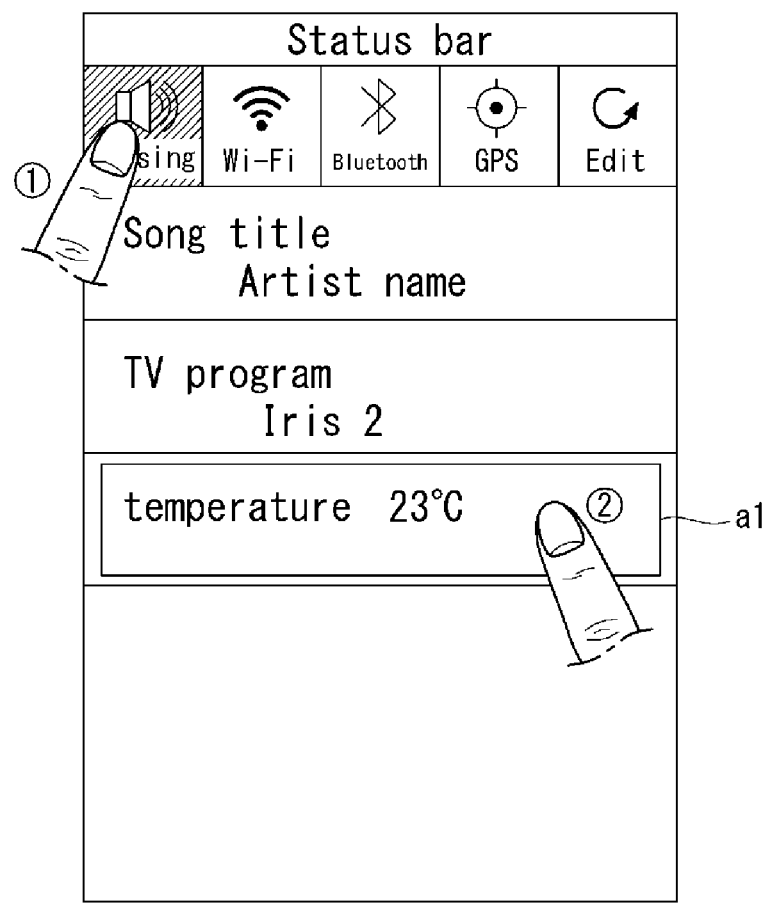

Referring to FIGS. 19 and 20, the controller 180 may select sensing data sensed in the mobile terminal as an object.

In detail, in a case in which an input ① applied to an application that manages sensing data is received in a status bar, the controller 180 may display the sensing data in the status bar.

In a case in which an input ② applied to "Song title Artist name" displayed as text upon sensing an external sound of the sensing data is received, the controller 180 may select "Song title Artist name (a1)" as an object.

When an input ② applied to "temperature 23°" displayed as text upon sensing temperature of the sensing data is received, the controller 180 may select "temperature 23° (a1)" as an object.

Figure 21:
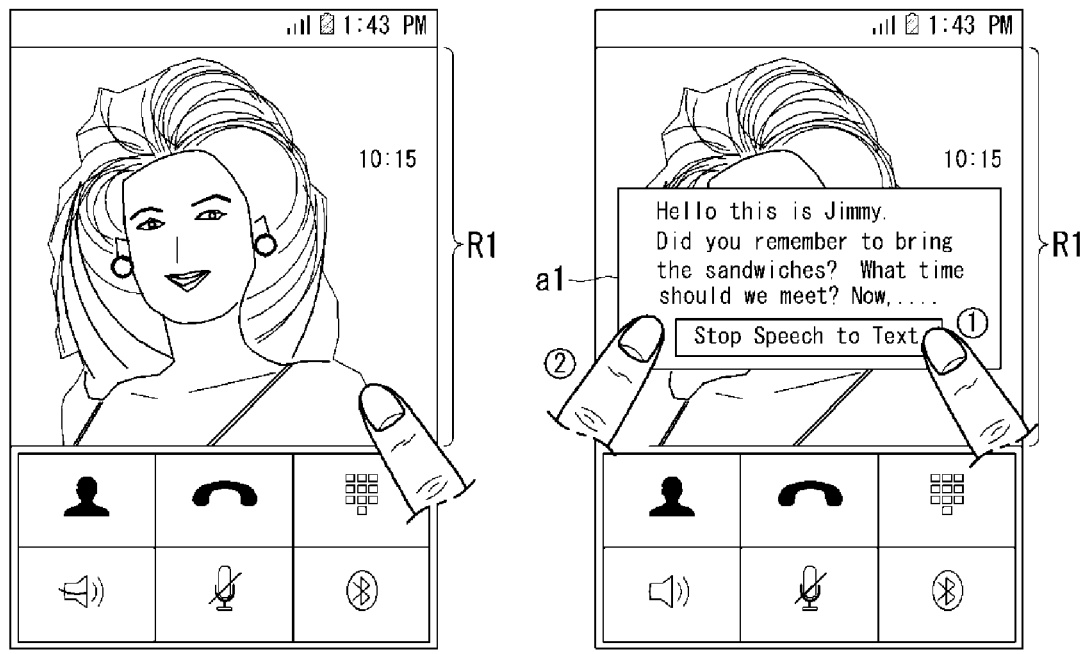

Referring to FIG. 21, in a case in which an input applied to a region in which a counterpart image is displayed is received during a video call, the controller 180 may convert call contents into text and display the converted text on the touch screen and may change the displayed text according to real-time call contents.

In a case in which a specific input ① (for example, an input for stopping conversion of call contents into text) is received while the text is being displayed and a touch input ② applied to the displayed text region is received, the controller 180 may select the displayed text a1.

Figure 22:
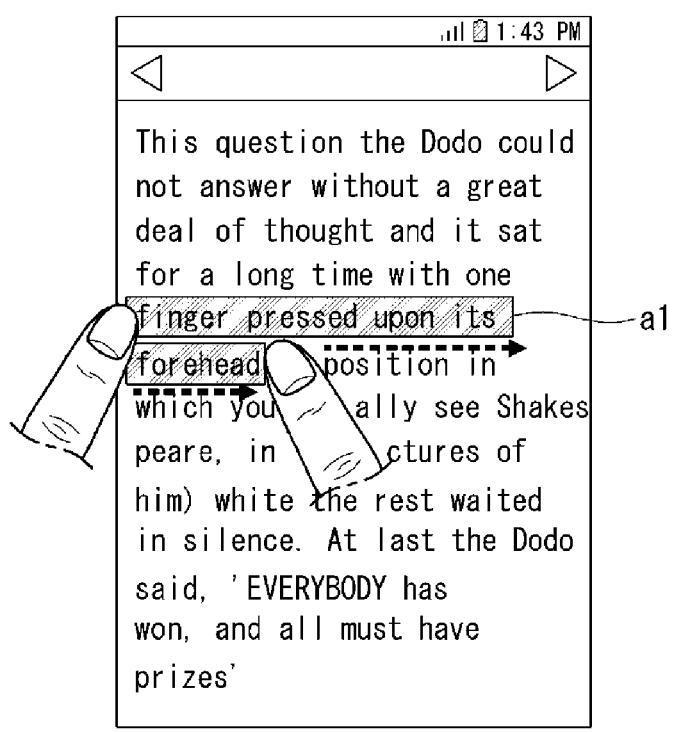

Referring to FIG. 22, in a case in which a drag input applied to a portion of text displayed on an executed screen of a specific application is received, the controller 180 may select text included in the region in which the drag input has been applied.

In detail, in a case in which a drag input applied to "finger pressed upon its forehead" is received, the controller 180 may select "finger pressed upon its forehead (a1)".

Like as in the embodiment as described above, the selected object may be displayed by using a size, contrast, an indicator, and the like, such that it is discriminated from other objects.

Figure 23:
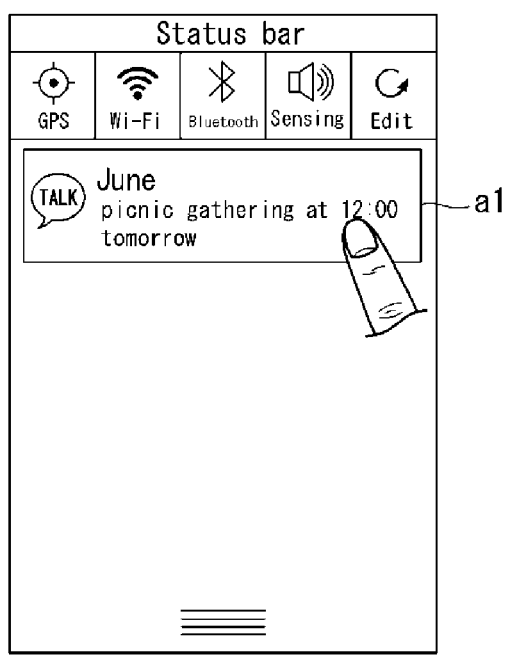

Referring to FIG. 23, in a case in which an input applied to a notification message displayed in the status bar is received, the controller 180 may select text included in the notification message (a1), as an object.

In detail, the controller may select "June picnic gathering at 12:00 tomorrow" included in a notification message a1, as an object.

Figure 24:
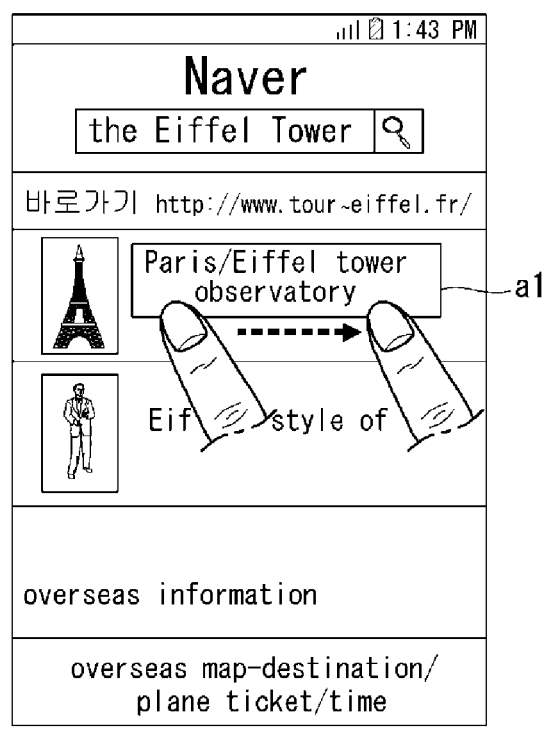

Referring to FIG. 24, when an input applied to a portion of search result displayed in a Web page search window is received, the controller 180 may select the portion of the displayed search result as an object.

In detail, in a case in which a drag input applied to "Paris/Eiffel Tower observatory (a1)" in the search result with respect to the Eiffel Tower is received, the controller 180 may select the "Paris/Eiffel Tower observatory (a1)".

Figure 25:
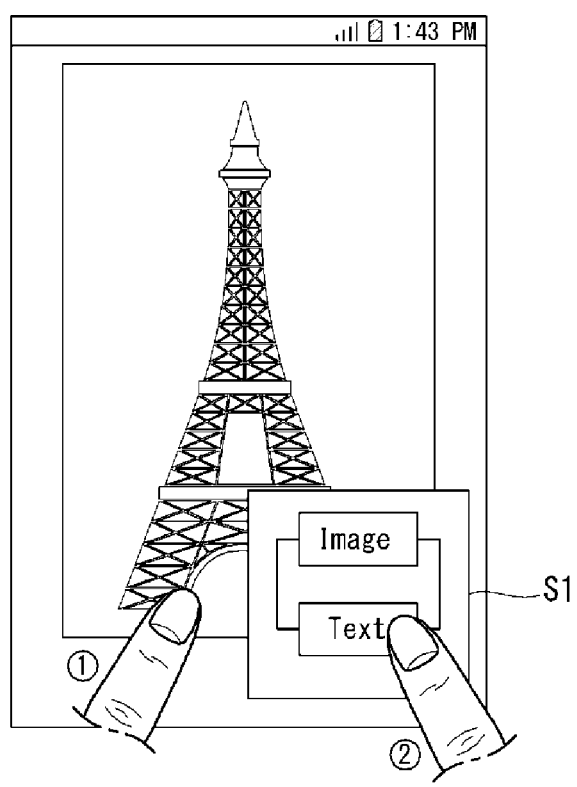

Referring to FIG. 25, in a case in which an input ① applied to an image displayed on the touch screen is received, the controller 180 may select any one of the image and text (for example, meta data, or the like, with respect to the image) related to the image, as an object.

In a case in which the input ① applied to the image displayed on the touch screen is received, the controller may display an icon for selecting any one of the image and the text related to the image as a pop-up window S1, and in a case in which a selective input ② applied to the text is received, the controller 180 may select the text as an object.

In the above, various methods for selecting an object according to types of object and an application in which an object is displayed have been described, but the present disclosure is not limited thereto and any other method for selecting an object displayed on a screen may also be applied.

FIGS. 26 through 29 are views illustrating a method of recommending an application in a mobile terminal related to an embodiment of the present disclosure.

Figure 26:
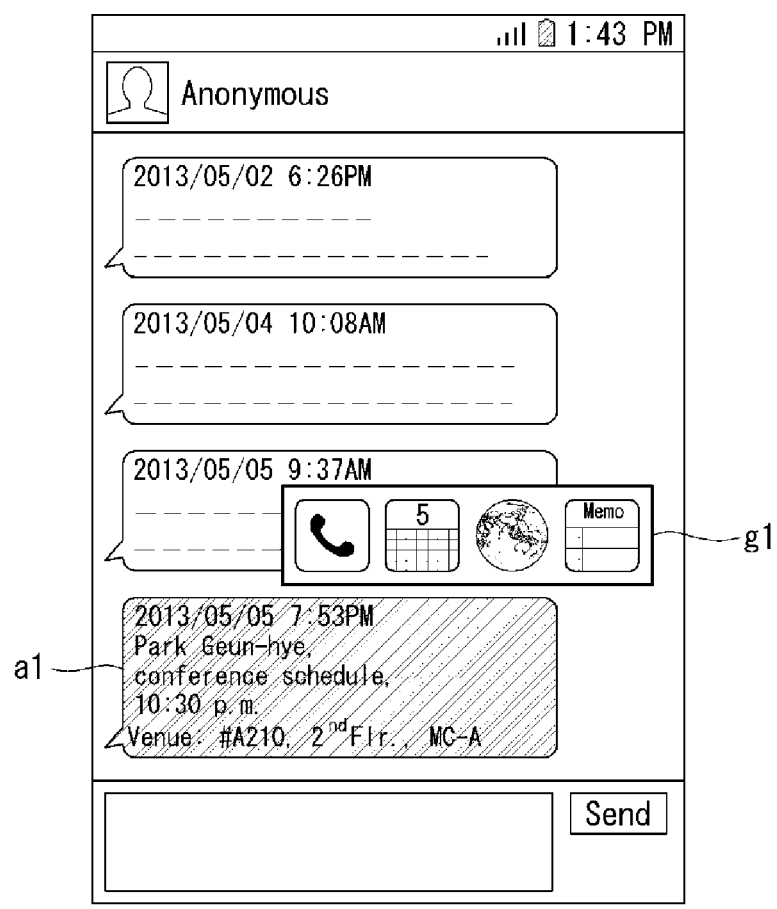
FIGS. 26 through 29 are views illustrating a method of recommending an application in a mobile terminal related to an embodiment of the present disclosure.

Referring to FIG. 26, in a case in which an application associated with the selected object (text) exists, the controller 180 may immediately display a first pop-up window g1.

The controller 180 may select the text displayed in a specific message reception window a1 as an object, search an application associated with contents of the selected object, and immediately display at least one associated application upon completion of searching, as the first pop-up window g1.

Figure 27:
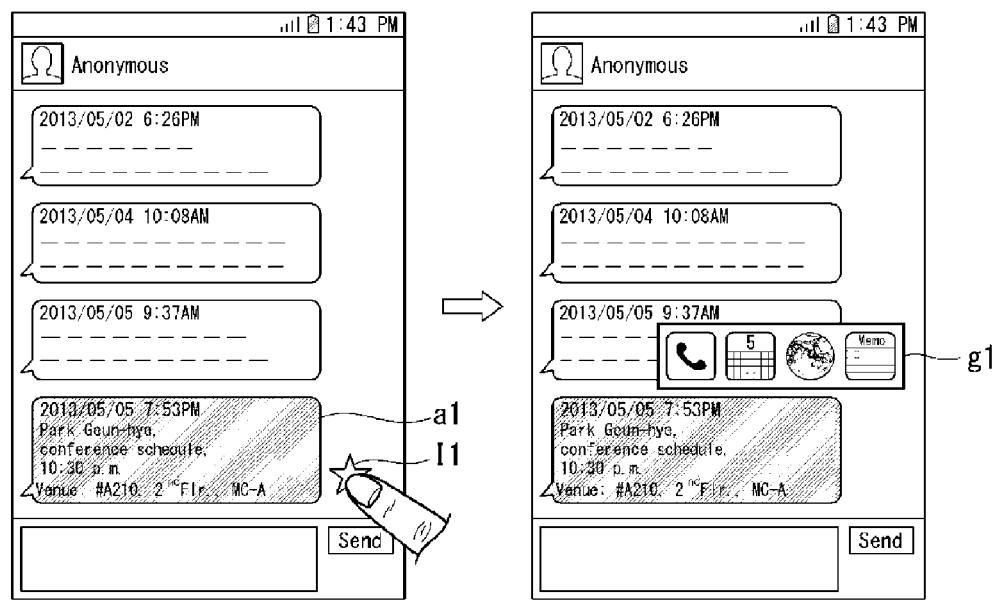
Figure 28:
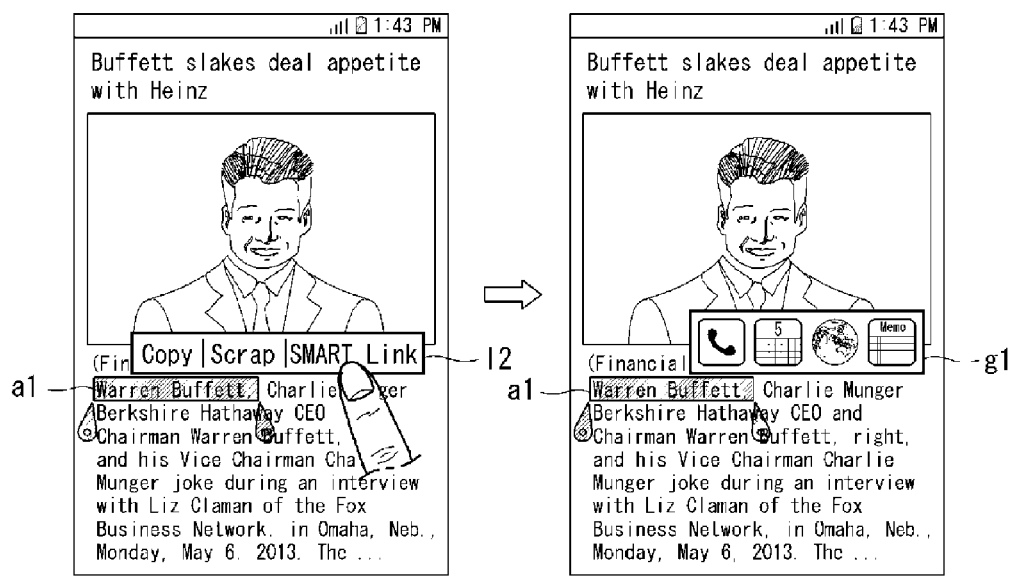
Figure 29:
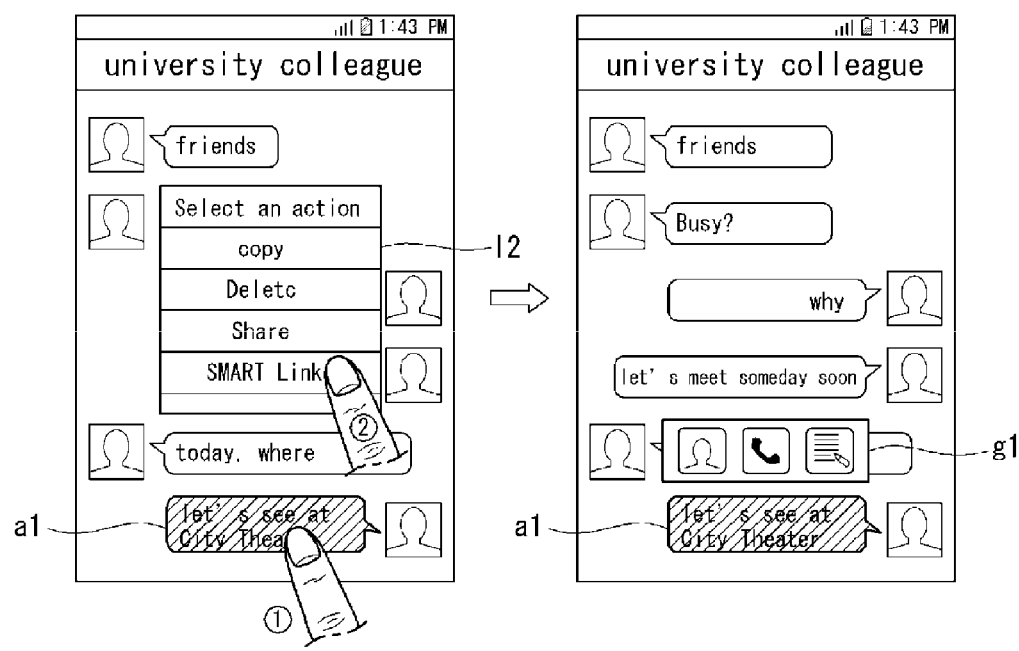

Referring to FIGS. 27 through 29, in a case in which an associated application with respect to the selected object (text) exists, the controller 180 may display an indicator or a menu item in advance to display the associated application.

The controller 180 may display a specific indicator I1 in the vicinity of the specific message reception window a1 displaying the selected object, or display a specific menu item (Smart Link of I2) in the vicinity of the region a1 displaying the selected object.

In this case, in a case in which a selective input applied to the specific indicator I1 or the specific menu I2 is received, the controller 180 may display at least one associated application, and the at least one application may be displayed as the first pop-up window g1.

FIGS. 30 through 41 are views illustrating a method of searching an associated application in a mobile terminal related to an embodiment of the present disclosure.

Figure 30:
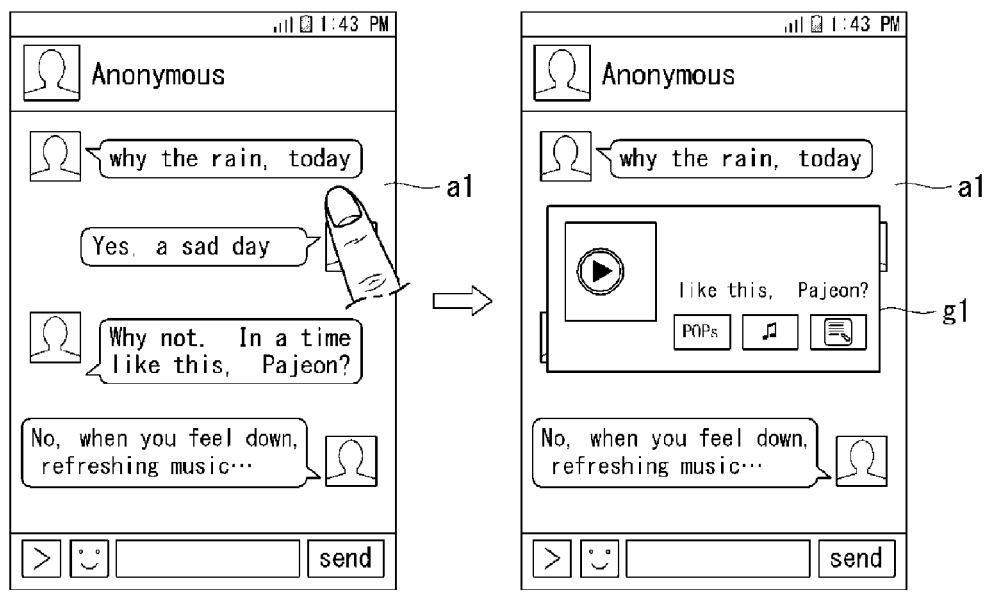
FIGS. 30 through 41 are views illustrating a method of searching an associated application in a mobile terminal related to an embodiment of the present disclosure.

Referring to FIG. 30, in a case in which an input applied to a specific region of a message display screen, the controller 180 may select text included in the message reception window a1, analyze context of the selected object, and search an associated application.

The controller 180 may extract information regarding a time, a venue, a name, a contact number, a number, a date, and a specific word from contents of the selected text to classify a category of the extracted information, and may recommend an associated application by the classified category.

In detail, the controller may extract words such as "rain", "sad", "mood", "music", or the like, included in the selected text, and determine an emotional state of the user and that required information is weather or music-related information based on the extracted information (for example, "music", "rain", and "mood").

Also, the controller 180 may recognize context of the extracted information and determine that the user's emotional state is a "sad state" and that the user considers "music play" as a subsequent behavior.

Thus, the controller may recommend (g1) "music play application", "weather application", and the like, as an associated application by using the results obtained by analyzing the context with respect to the selected object.

When at least one application is recommended, the controller 180 may dispose applications in order, starting from one having the highest association, and display such that a size of an icon indicating the application having the highest association is greater than those of any other applications. Also, the controller 180 may change recommendation order of at least one associated application by using application usage history information of the user.

The controller 180 may include a behavior guide as a specific usage form of the application having the highest association in the pop-up window g1 and provide the same. For example, in recommending a music play application, the controller 180 may a specific usage form of the music play application such as "So sad. Please listen to soft music" as a behavior guide.

Figure 31:
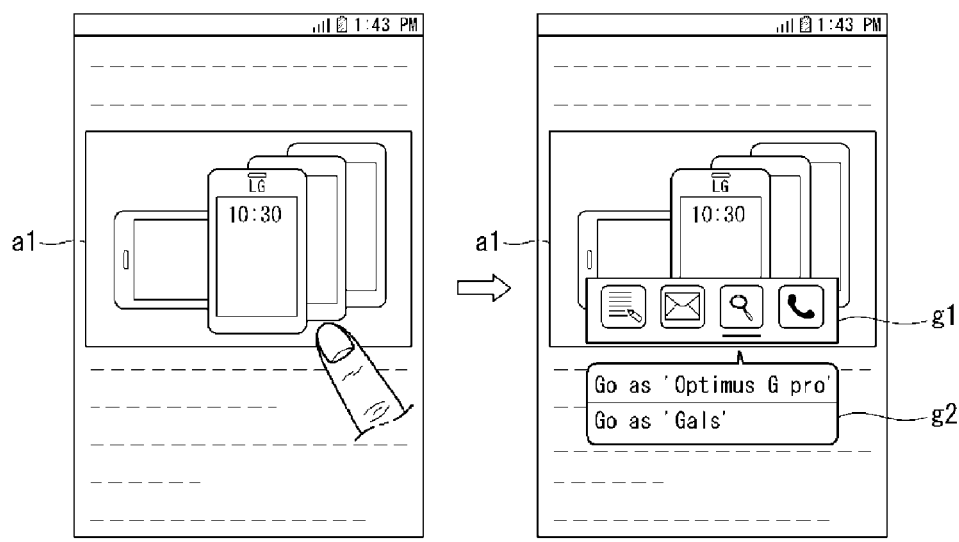

Referring to FIG. 31, in selecting a specific application, the controller 180 may include a behavior guide, an implementation form related to the selected object in the history of the use of the specific application by the user, in the pop-up window g1, and provide the same.

For example, when a mobile phone image, text "10:30" and "LG" displayed in the image, and thumbnail information "Color: Red, White, Black", "File Name: Electronics", and "1:1:1 Layout" are selected as an object and a search application is selected, the controller 180 may provide history of searching "Optimus G pro" and "Gas S" as a behavior guide.

In a case in which a different application related to the selected object is selected, for example, in a case in which a memo application is selected, the controller 180 may convert the selected object and provide "LG mobile phone" as a converted object to the pop-up window g1. Namely, the controller 180 may provide a different converted object, namely, a behavior guide, according to a selected application.

Figure 32:
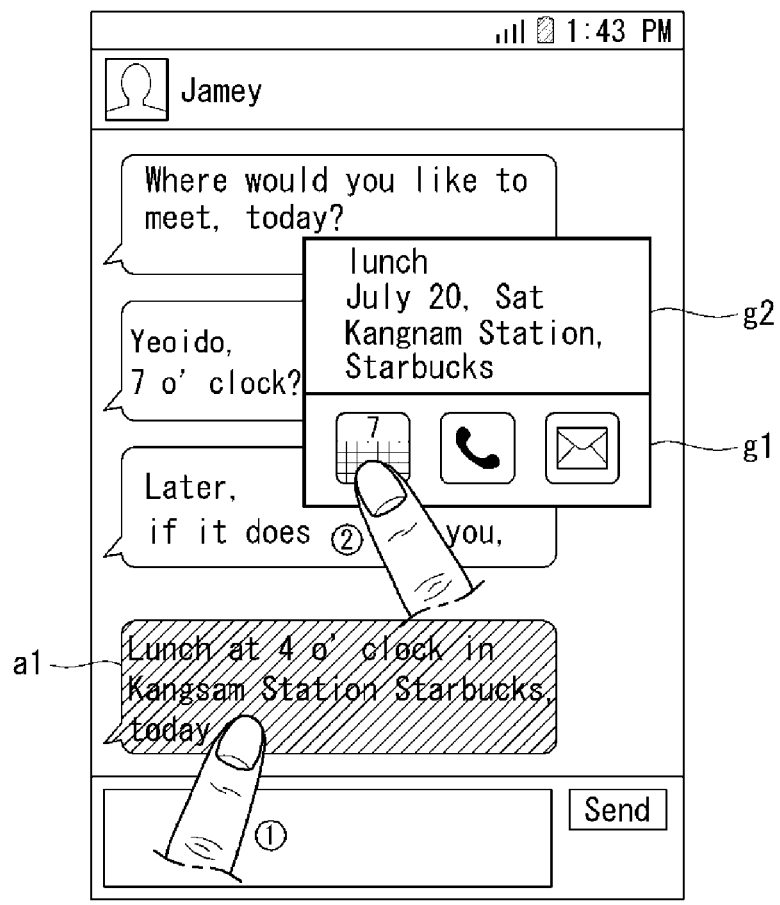

Referring to FIG. 32, the controller 180 may recommend at least one associated application as a pop-up window g1 according to a selected object, and when a specific application is selected ②, the controller 180 may convert the selected object into a form appropriate for an input item of the specific application and provide the same as a pop-up window g1.

In detail, in a case in which words indicating time and venue are included in the selected object, the controller 180 may recommend a calendar application, and when the calendar application is selected ②, the controller 180 may convert the selected object into a form appropriate for an input application of the calendar application and provide the same. Namely, the controller 180 may parse the selected object into a "name", "date", and "venue" input items of the calendar application, and provide them as a converted object g2.

The controller 180 may further provide a subsequent behavior guide of the user by using a selected specific application, and the behavior guide may include a converted object indicating a simple usage form (for example, calendar registration, alarm setting, making a call, and the like) of the specific application, or an applicable form (for example, text parsed according to an input item, or the like) corresponding to the specific application.

The converted object may include a different type of behavior guide that may be used in the specific application by using the selected object, as well as a form directly related to the selected object.

The user may check the converted object to execute the specific application (for example, the calendar application), or edit the converted object and subsequently execute the specific application. In a case in which an input applied to the region in which the converted object is displayed is received, the controller 180 may provide an editing screen for editing the converted object.

Figure 33:
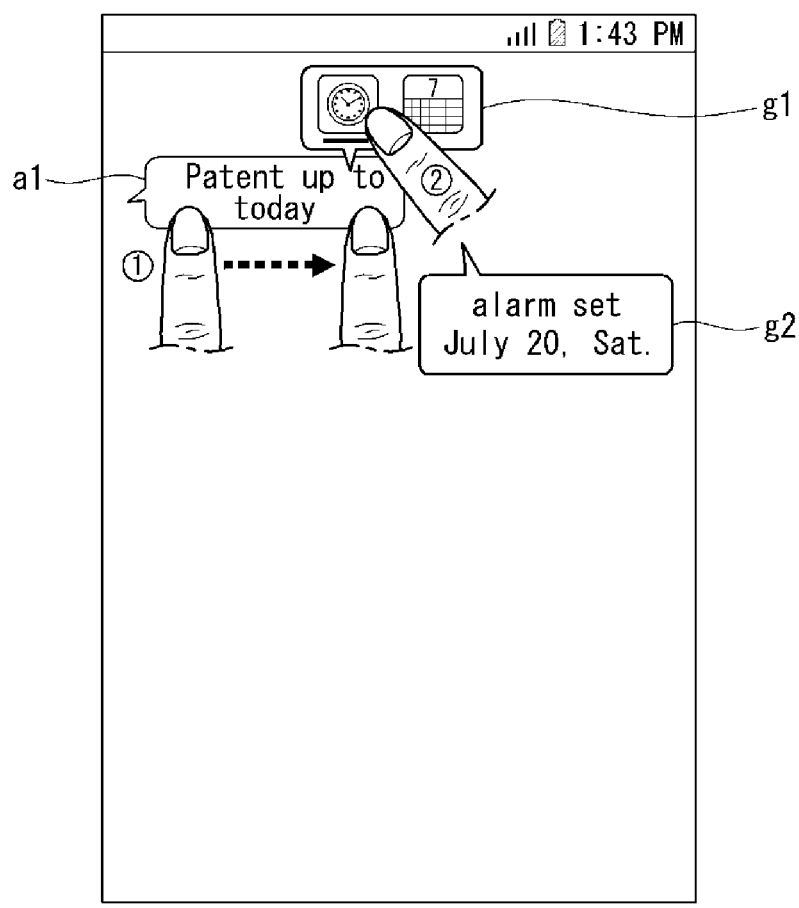

Referring to FIG. 33, in a case in which an object a1 including a word indicating time is selected ①, the controller 180 may recommend, for example, an alarm application or a calendar application as an associated application.

In detail, the controller 180 may extract "today" indicating time from the selected object a1 and use it to search an associated application. The controller 180 may compare a current date of the mobile terminal with an objective date indicated by "today" of the selected object, and when it is determined to be required to be registered as a future schedule, the controller 180 may recommend the alarm or calendar applications as an associated application.

Figure 34:
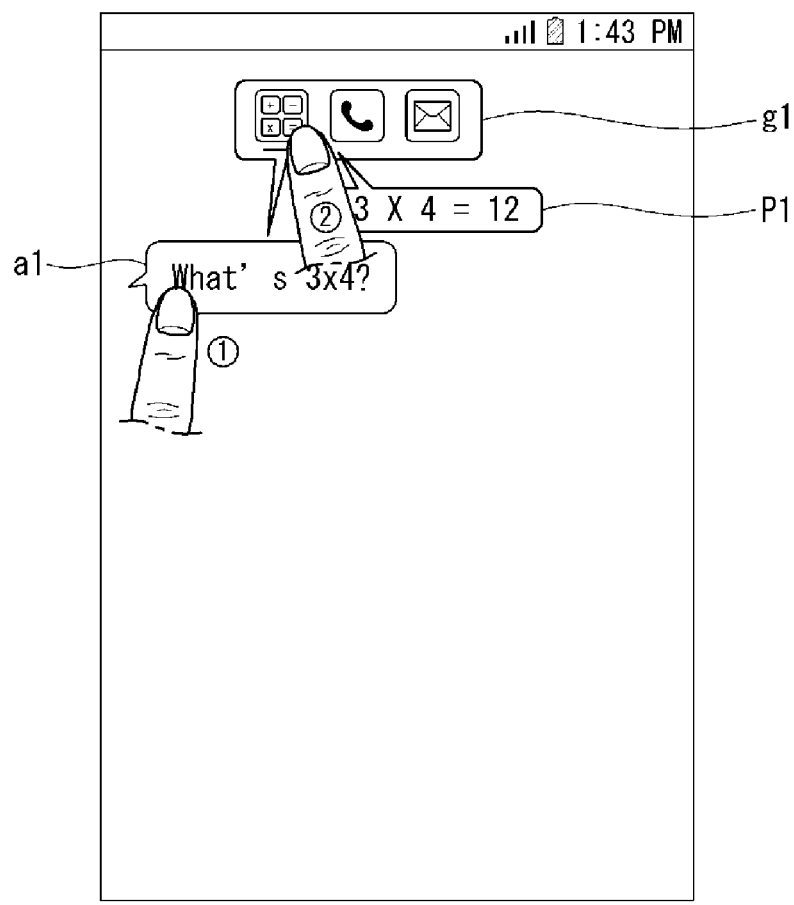

Referring to FIG. 34, when an object a1 including a word indicating number or symbols of operation is selected ①, the controller 180 may recommend a calculator application as an associated application in a pop-up window g1.

When the calculator application is selected ②, the controller 180 may provide executed result of the calculator application in a different pop-up window P1.

Referring to FIGS. 35 through 38, the controller 180 may determine a current state of the mobile terminal and recommend an application associated with the current state of the mobile terminal.

The current state of the mobile terminal may include state information that may be sensed or obtained by the mobile terminal, such as sensing data, a connection state with a different device, a network state, a CPU usage rate, location information received from a different device, time information, executed information of a specific application, and the like, sensed by using a sensing unit installed in the mobile terminal.

Figure 35:
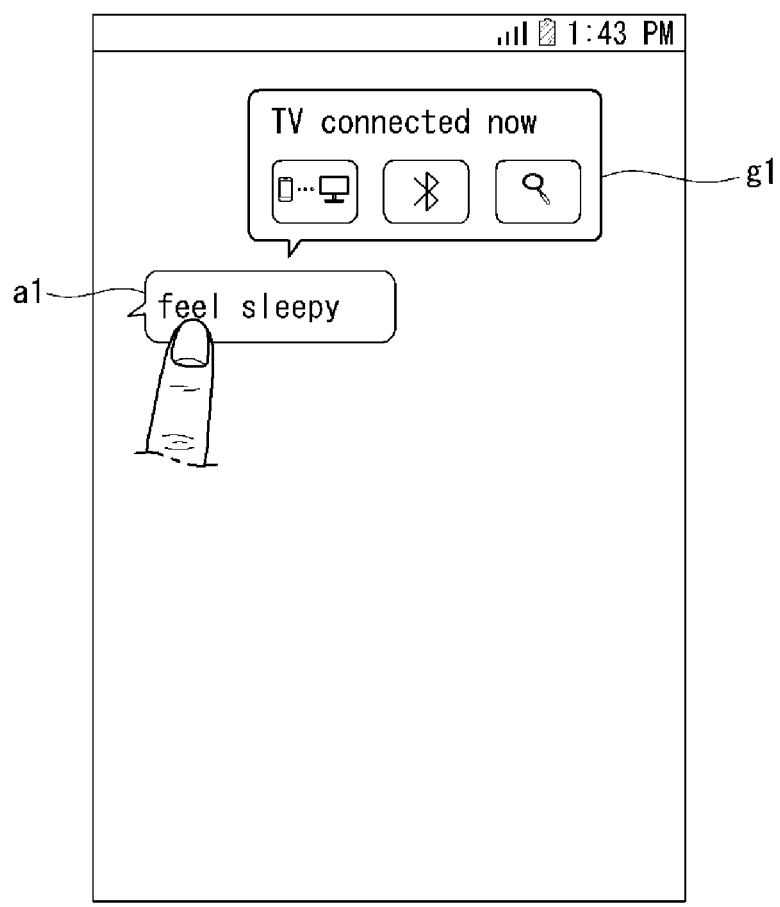

In a case in which an object a1 of "feel sleepy" is selected, the controller 180 may determine a current state of the mobile terminal, and when the mobile terminal is connected to an external device, the controller 180 may include an application that may be able to control the connection state with the external device in a pop-up window g1 and recommend an associated application (please refer to FIG. 35).

The controller 180 may recommend an associated application by using location information or time information received from a different device, and when a selected specific application is used, the controller 180 may provide a behavior guide by using the selected object and the current state of the mobile terminal.

Figure 36:
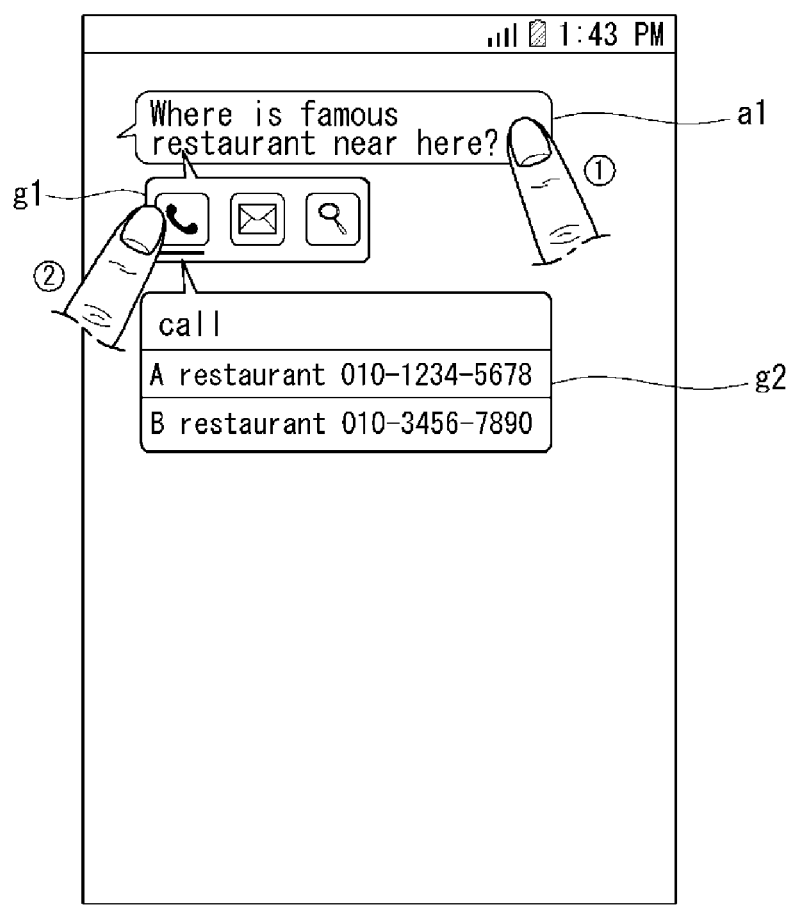

When a call application is executed by using the location information and the selected object, the controller 180 may provide a phone number of an adjacent restaurant (restaurant A or a restaurant B) as a behavior guide in a pop-up window g2 (please refer to FIG. 36).

Figure 37:
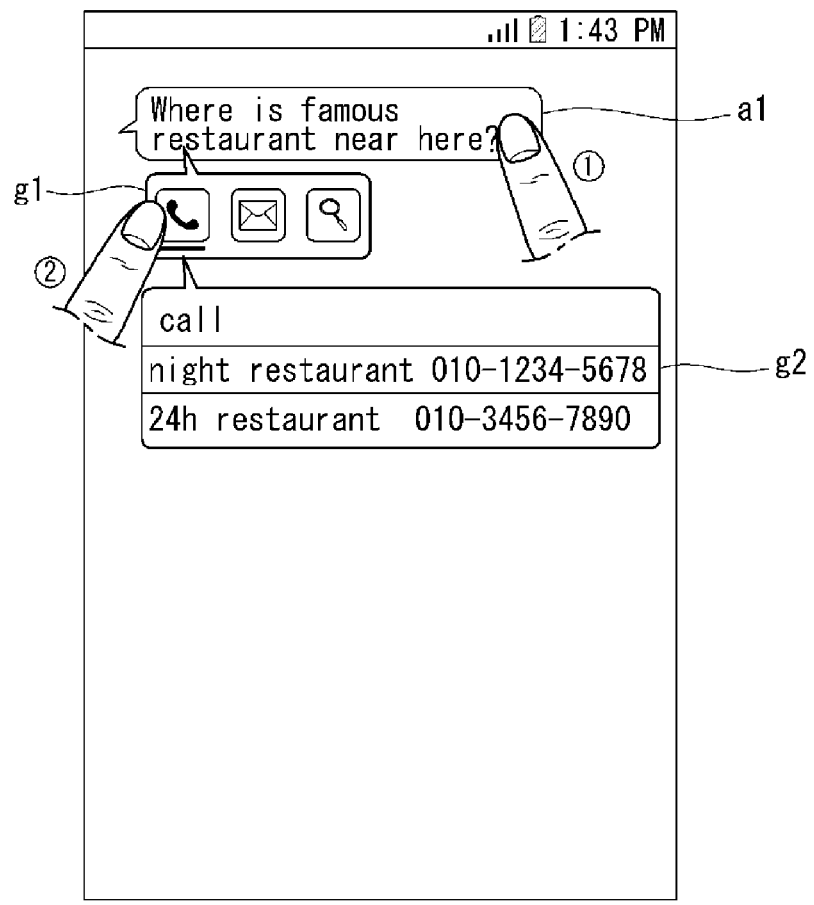

When the call application is executed by using time information and a selected object, the controller 180 may provide a phone number of a restaurant which is open even in the middle of the night as a behavior guide in a pop-up window g2 (please refer to FIG. 37).

Figure 38:
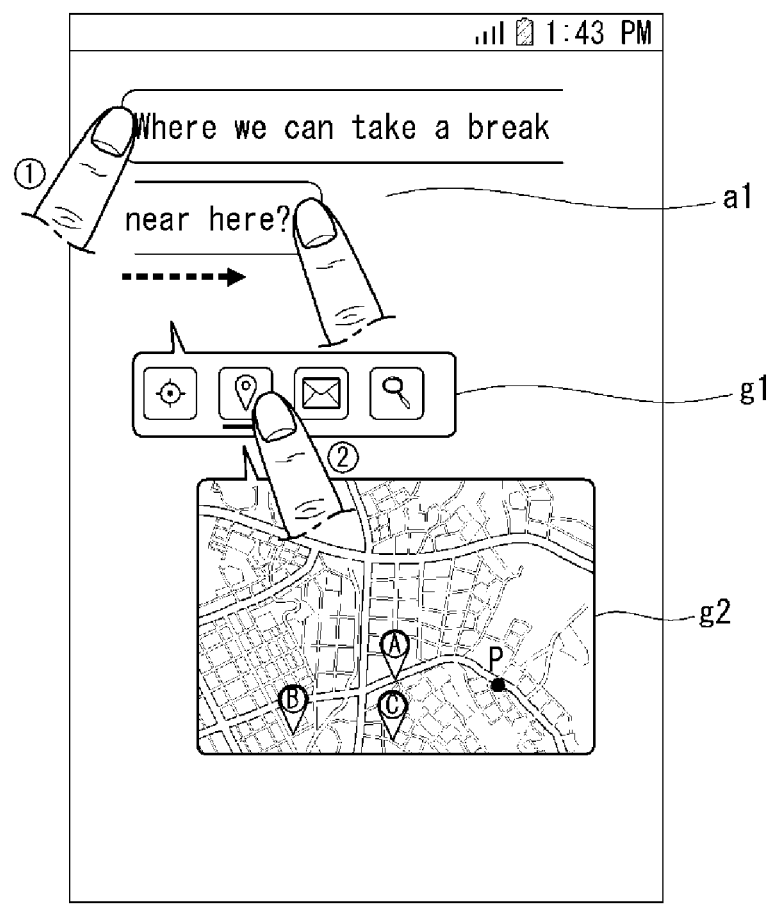

When a map search application is executed by using navigation application information executed in the mobile terminal and a selected object, the controller 180 may provide a location of accommodation facilities located between a current location P and a destination as a behavior guide (please refer to FIG. 38). The controller 180 may provide the behavior in various forms such as text, an image, a sound, and the like.

Figure 41:
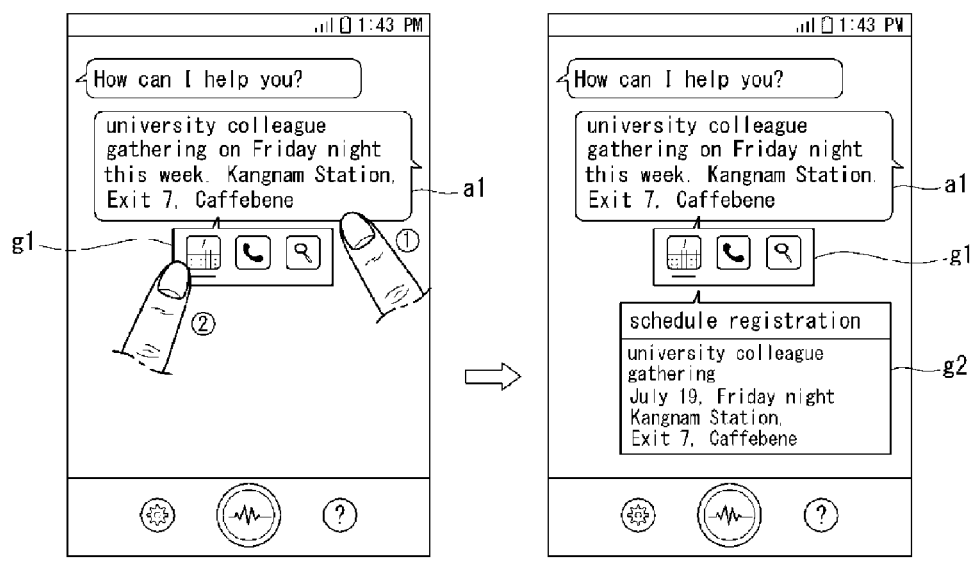

For example, when Smart Link function is executed while a quick voice application is being executed, the controller 180 may provide a behavior guide for using a selected specific application by voice (please refer to FIG. 41).

Figure 40:
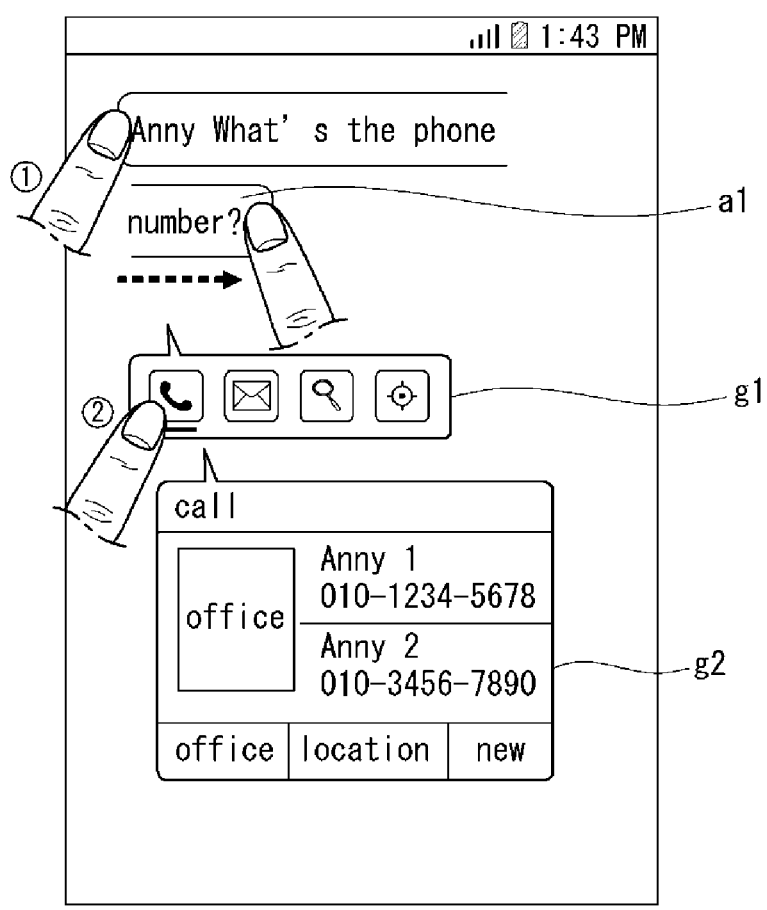

When a call application is executed by using location information and a selected object, the controller 180 may provide a contact number as a behavior guide, and in this case, the controller 180 may determine order for providing contact numbers in consideration of association with location information (please refer to FIG. 40). Namely, in a case in which current location information of the mobile terminal is an office, the controller 180 may first recommend "Anny" stored as a company colleague among "Anny" stored in the contact numbers.

Figure 39:
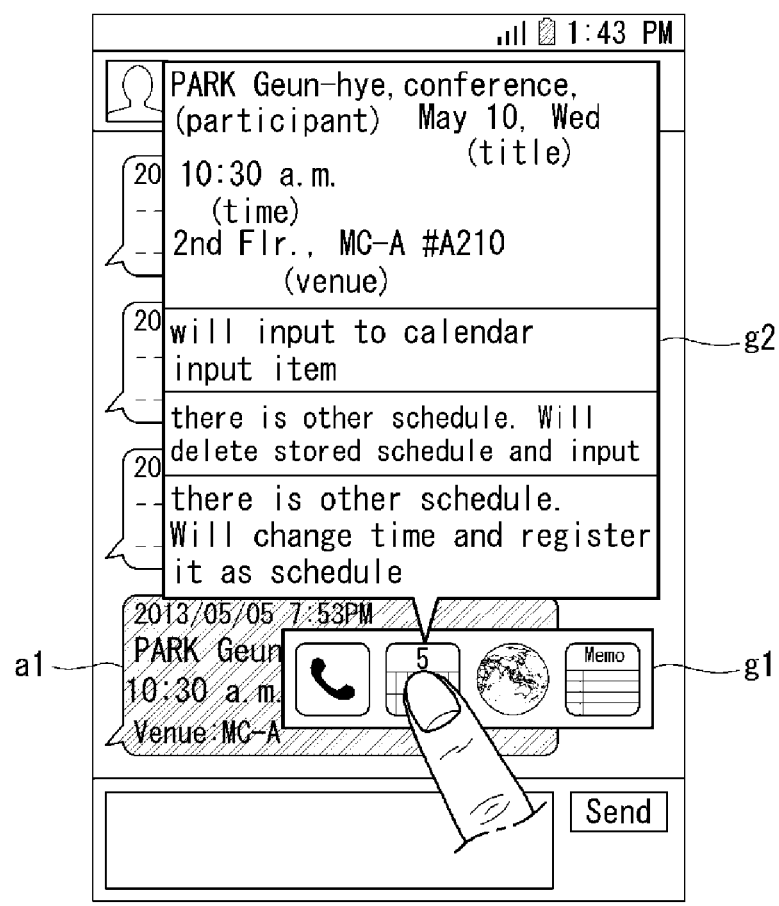

Referring to FIG. 39, the controller 180 may provide a usage form of a converted object as a behavior guide with respect to the selected application so as to be specifically selected.

For example, in a case in which a selected object is "Park Geun-hye, conference May 10 (Wed.) 10:00 a.m. venue: #A210, $2^{nd}$ Flr., MC-A" and a calendar application is selected as a specific application, the controller 180 may convert the selected object into a form appropriate for an input item of the calendar application to provide the converted object, and additionally provide a behavior guide as to whether the converted object is to be applied to the specific application, in a pop-up window g2.

Thus, the controller 180 may determine whether to directly apply the converted object into execution of the specific application according to a user's selective input.

In the above, embodiments in which the controller 180 displays a behavior guide with respect to an associated application and a selected application in the form of pop-up window g1 and g2 have been described, but a different display method of displaying them together with an object being currently edited may also be used.

Figure 42:
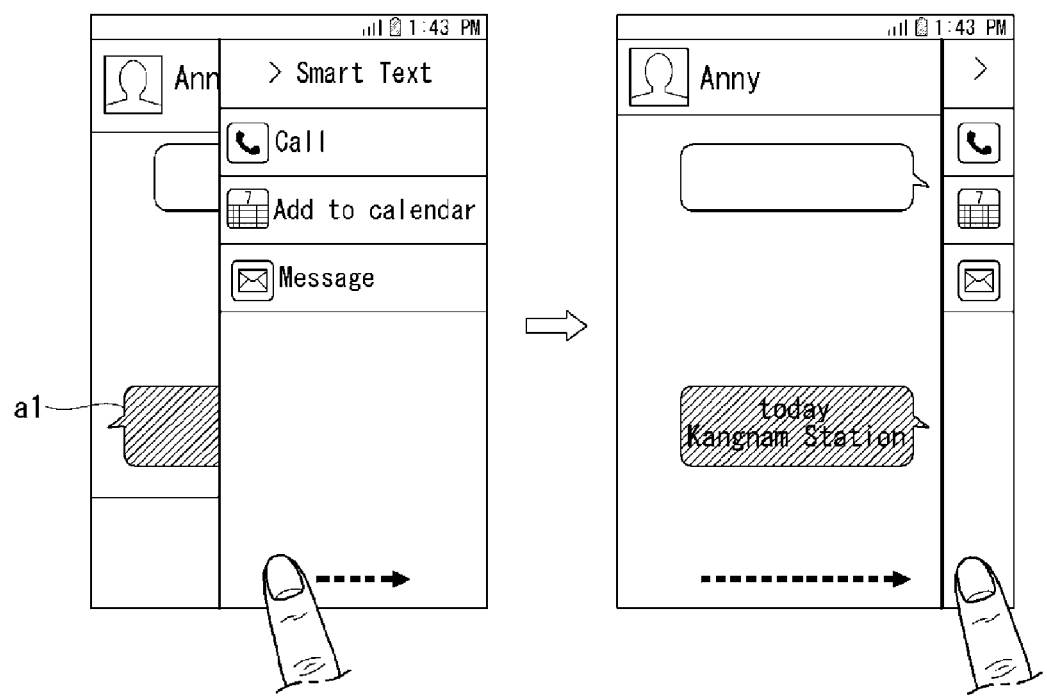
FIGS. 42 through 44 are views illustrating a method of displaying an associated application on a touch screen of a mobile terminal related to an embodiment of the present disclosure.
Figure 43:
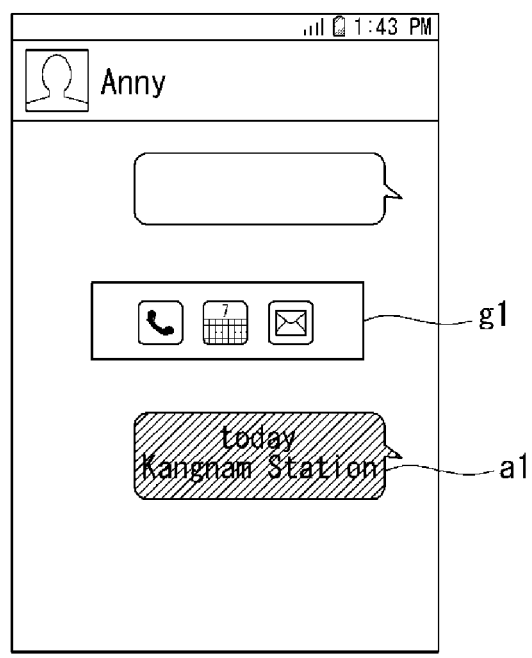
Figure 44:
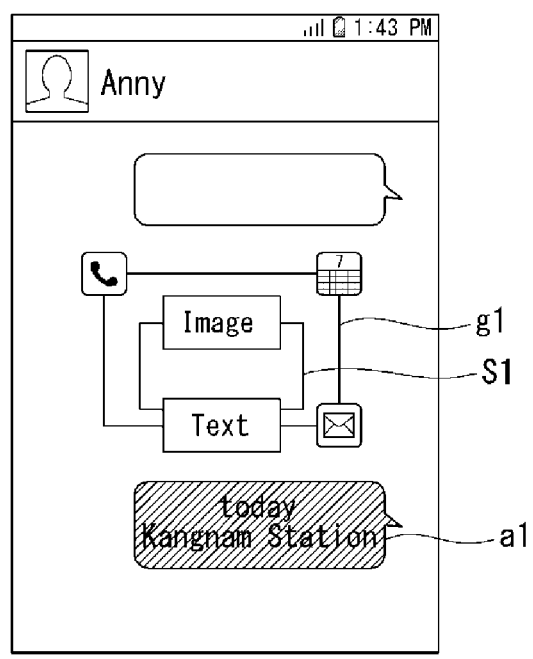

FIGS. 42 through 44 are views illustrating a method of displaying an associated application on a touch screen of a mobile terminal related to an embodiment of the present disclosure.

Referring to FIG. 42, the controller 180 may display a screen including an associated application and a behavior guide such that a region in which an object is displayed slides. Namely, the user may be provided with information regarding a selected object and an associated application, while checking an object being currently edited, by sliding the region in which the object is displayed in the screen including the associated application and the behavior guide.

Referring to FIG. 43, the controller 180 may provide the screen including the associated application and the behavior guide in an upper portion of the region in which the object is displayed, as a pop-up window g1. In this case, the controller 180 may sequentially display the pop-up window providing the associated application and the pop-up window providing the behavior guide separately, or provide such that contents displayed in a single pop-up window is changed.

Referring to FIG. 44, the controller may provide the screen including the associated application and the behavior guide in the form of a mind map.

In detail, the controller 180 may display a type of the selected object as a first level s1 for selecting text or an image, and when a type of the object is selected as text, the controller 180 may display the associated application as a second level, and display a behavior guide applied to the specific application as a third level.

When a specific item is selected, the controller 180 may display connection lines connecting next levels to cross in the selected specific item.

FIGS. 45 through 50 are vies illustrating displaying and editing a converted object in a mobile terminal related to an embodiment of the present disclosure.

Figure 45:
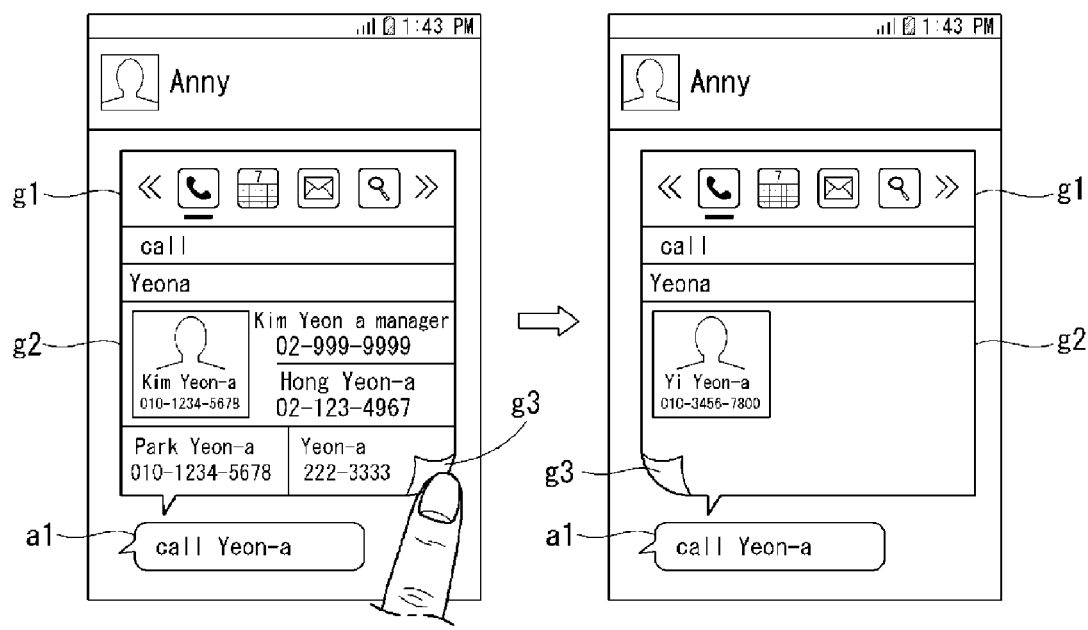
FIGS. 45 through 50 are vies illustrating displaying and editing a converted object in a mobile terminal related to an embodiment of the present disclosure.

Referring to FIG. 45, the controller 180 may provide at least one behavior guide according to a selected specific application. The behavior guide may include a form obtained by converting a selected object and information related to the selected object.

In a case in which contents of a behavior guide exceeds a pre-set range, the controller 180 may display exceeding contents in a next page, and in a case in which a pop-up window g2 providing a behavior guide includes two or more pages, the controller 180 may differently display a portion of a lower end region of the pop-up window g2. For example, the controller 180 may display an indicator g3 including, for example, a page in a folded form, display a page number, or display a guide for moving to a next page or previous page.

In a case in which a touch or flicking input applied to the lower region of the pop-up window g2 or selection of the indicator g3 is received, the controller 180 may switch to a previous page or a next page.

Figure 46:
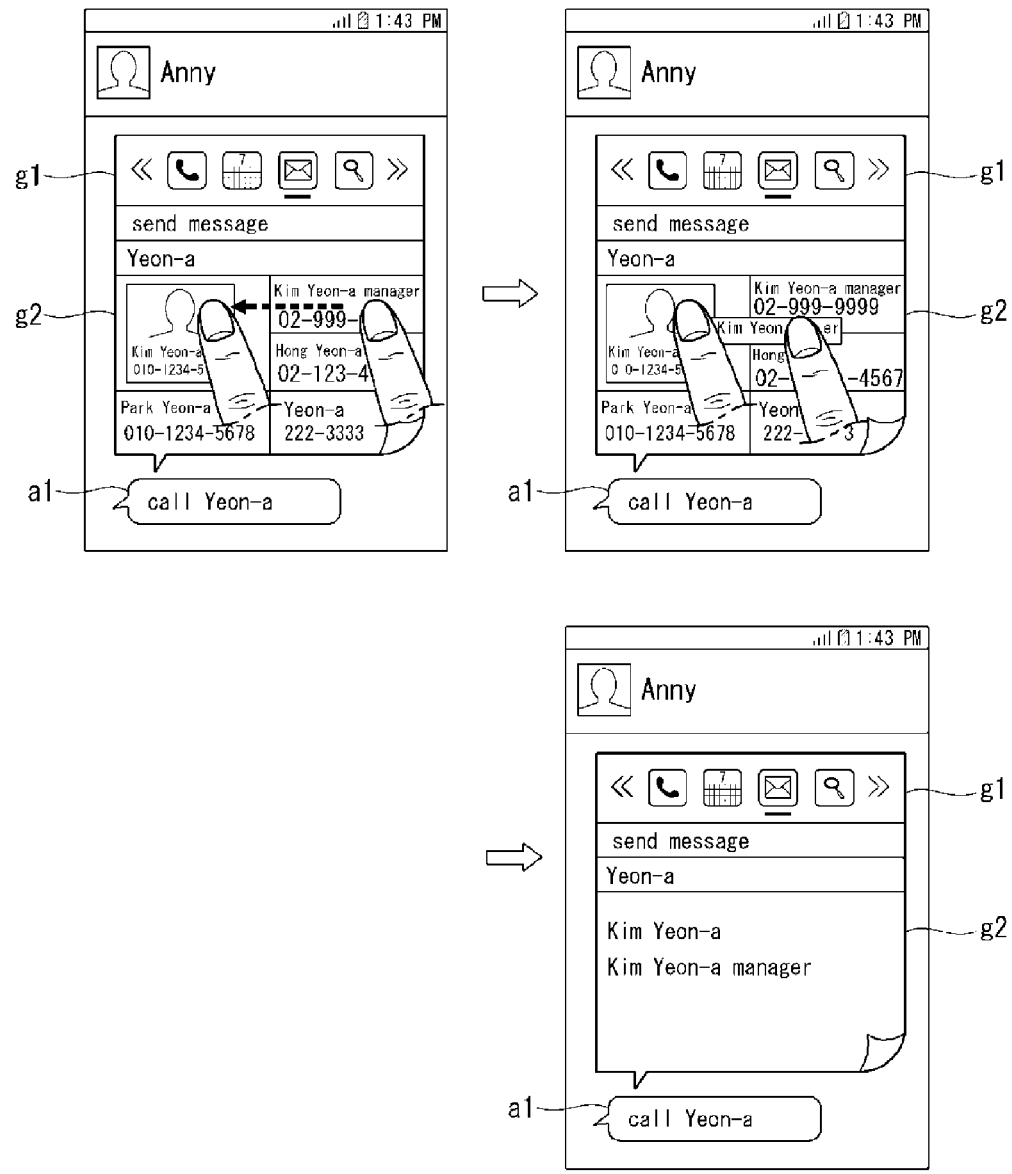
Figure 47:
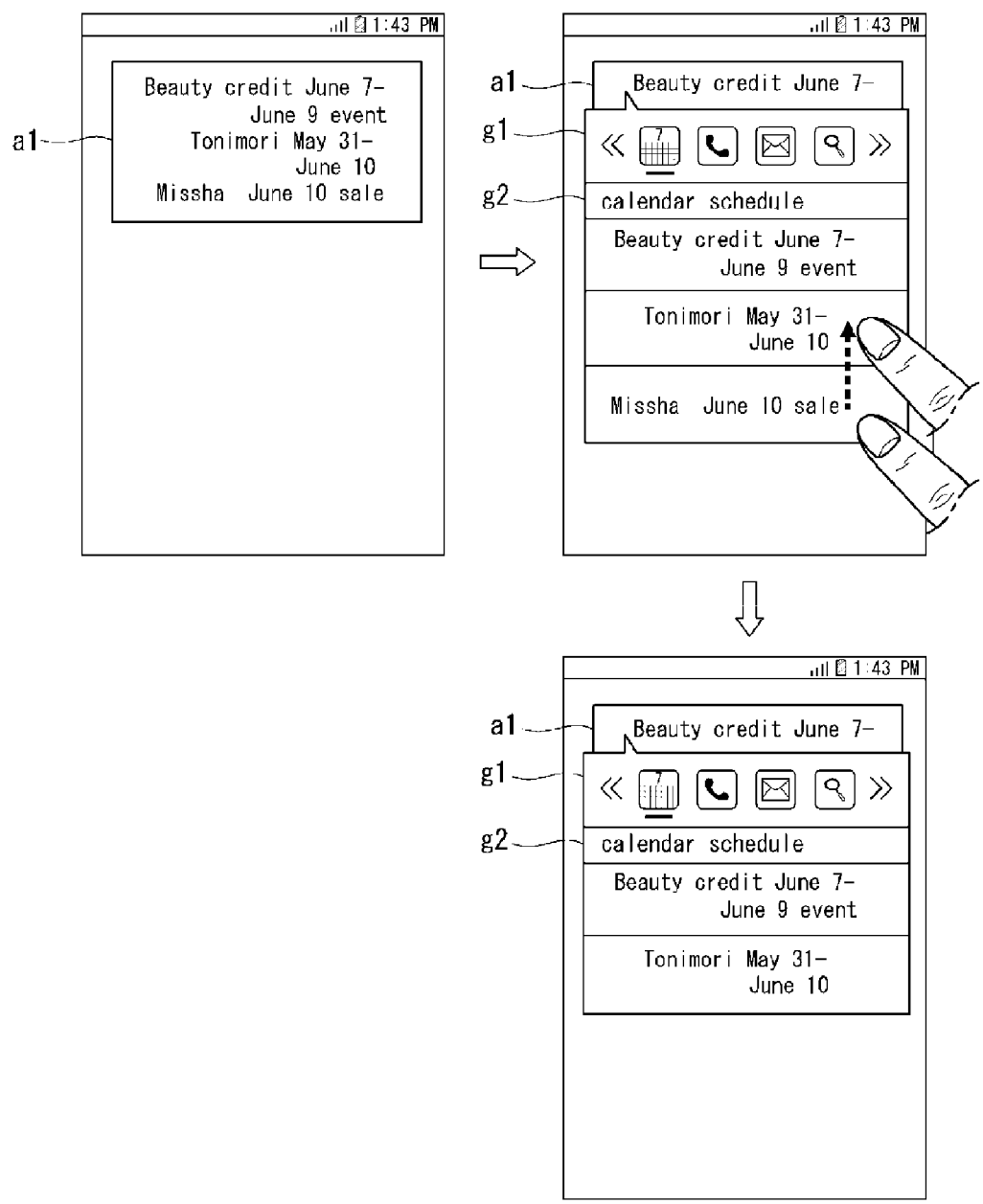

Referring to FIGS. 46 and 47, in a case in which an input with respect to the behavior guide displayed in the pop-up window g2 is received, the controller 180 may edit the behavior guide.

The controller may detect a touch on "Manager, Kim Yeon-a" displayed as a behavior guide, subsequently drag to a region for "Kim Yeon-a" to integrate the two items, select the item integrating "Manager, Kim Yeon-a" and "Kim Yeon-a" and transmit a text message to the two persons simultaneously (please refer to FIG. 46).

The controller may detect a touch on "Missha June 10 Sale" displayed as a behavior guide and an input to drag it to an item "Tonimori May 31-June 10" to integrate the two items, and edit it as an item "Tonimori, Missha Sale on June 10," for example.

Figure 48:
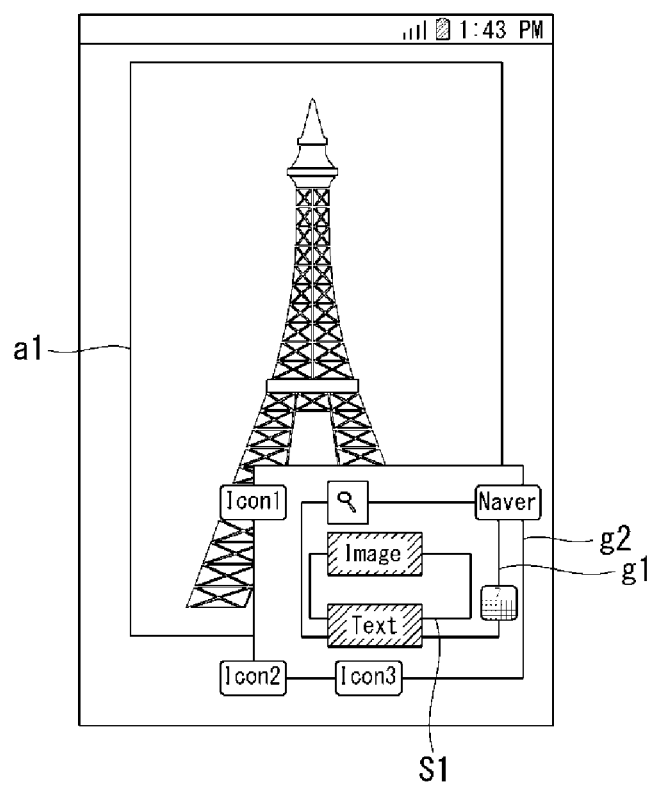
Figure 49:
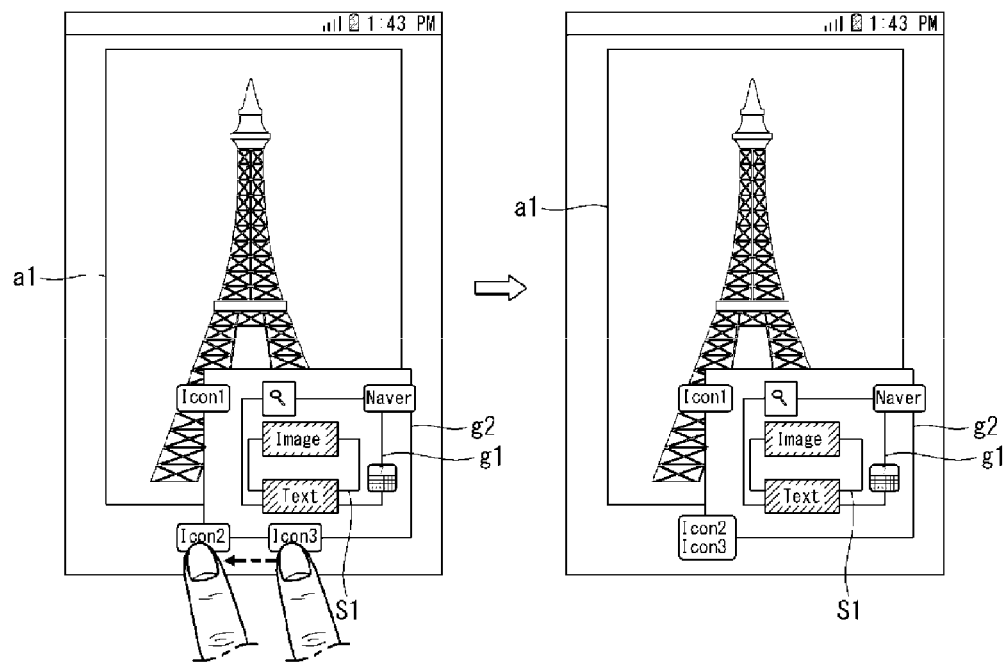
Figure 50:
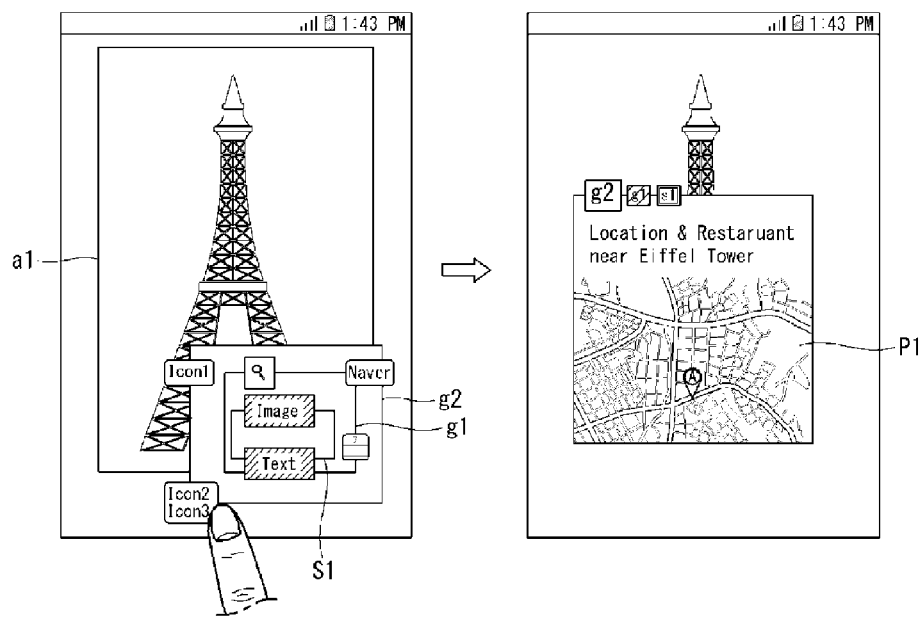

Referring to FIGS. 48 through 50, the controller 180 may edit behavior guides Icon1, Icon2, and Icon3 displayed in the form of a mind map.

In a case in which Icon3 is touched and dragged to a region in which Icon2 is displayed, the controller may integrate Icon2 and Icon3 and display the same in the region in which Icon2 is displayed (FIG. 49).

In a case in which a selective input applied to the integrated Icon2 and Icon3 is received, the controller 180 may input "Icon2" and "Icon3" together to a search item of a Naver application to execute an application, and provide corresponding search result P1 (FIG. 50).

For example, in a case in which Icon2 is "Location of the Eiffel Tower" and Icon3 is "Restaurant near the Eiffel Tower", the user may obtain a search result for the two queries at the same time by integrating the two items.

FIGS. 51 through 55 are views illustrating an executed screen of a specific application in a mobile terminal related to an embodiment of the present disclosure.

Figure 51:
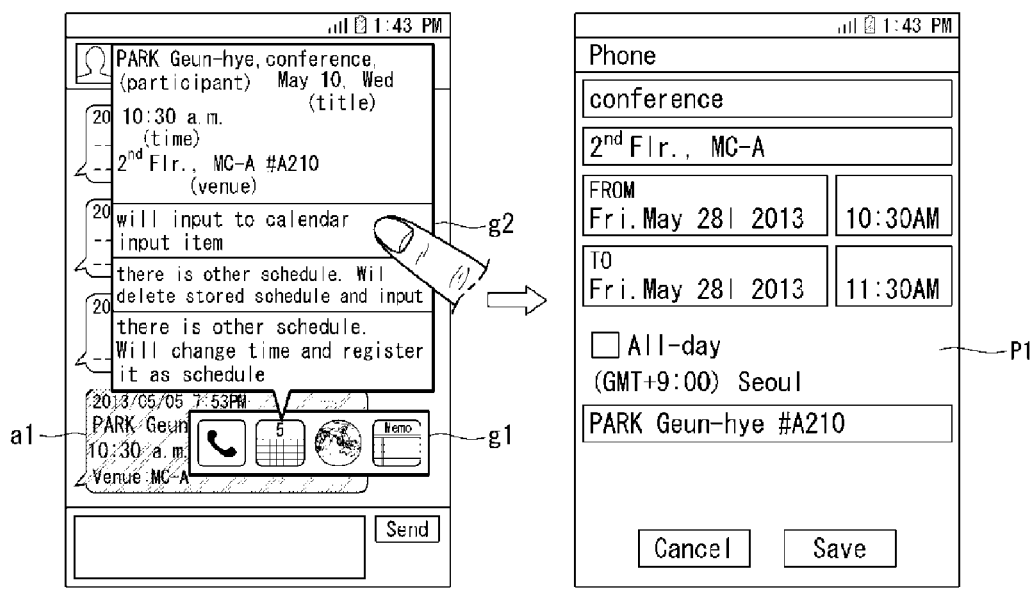
FIGS. 51 through 55 are views illustrating an executed screen of a specific application in a mobile terminal related to an embodiment of the present disclosure.
Figure 52:
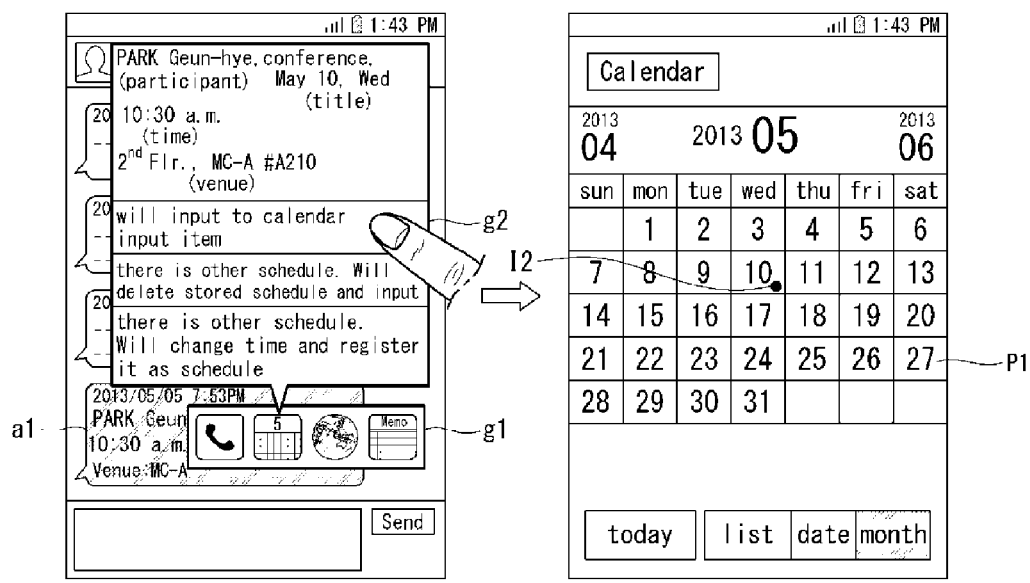

Referring to FIGS. 51 and 52, in a case in which a specific application is executed according to the selected behavior guide g2, the controller 180 may display an executed screen P1 as an entire screen.

The controller 180 may select a screen (please refer to FIG. 51) in which an execution process may be checked or a screen (please refer to FIG. 52) in which execution has been completed, and display it as an entire screen.

Figure 53:
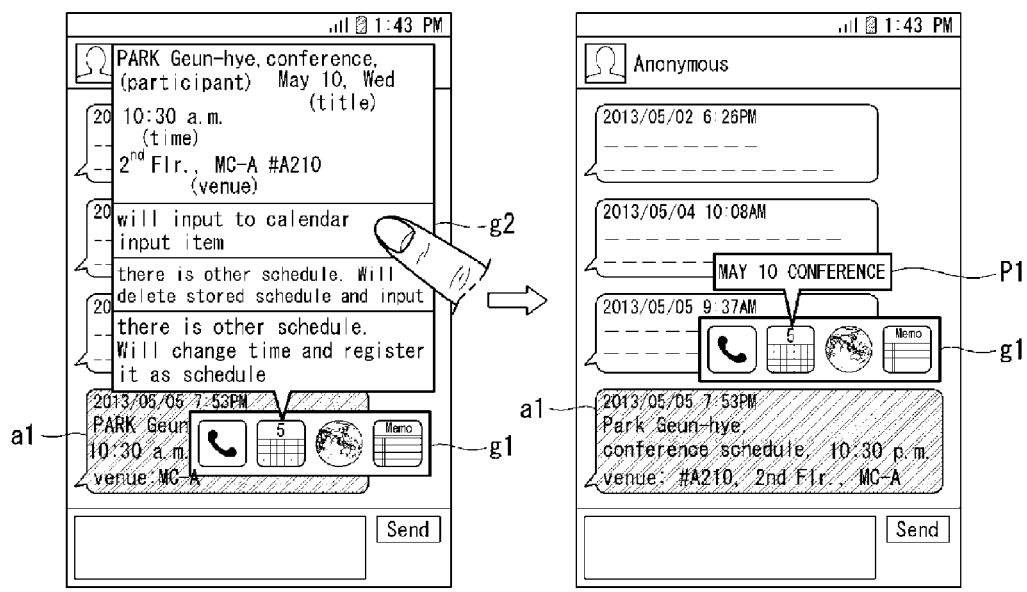
Figure 54:
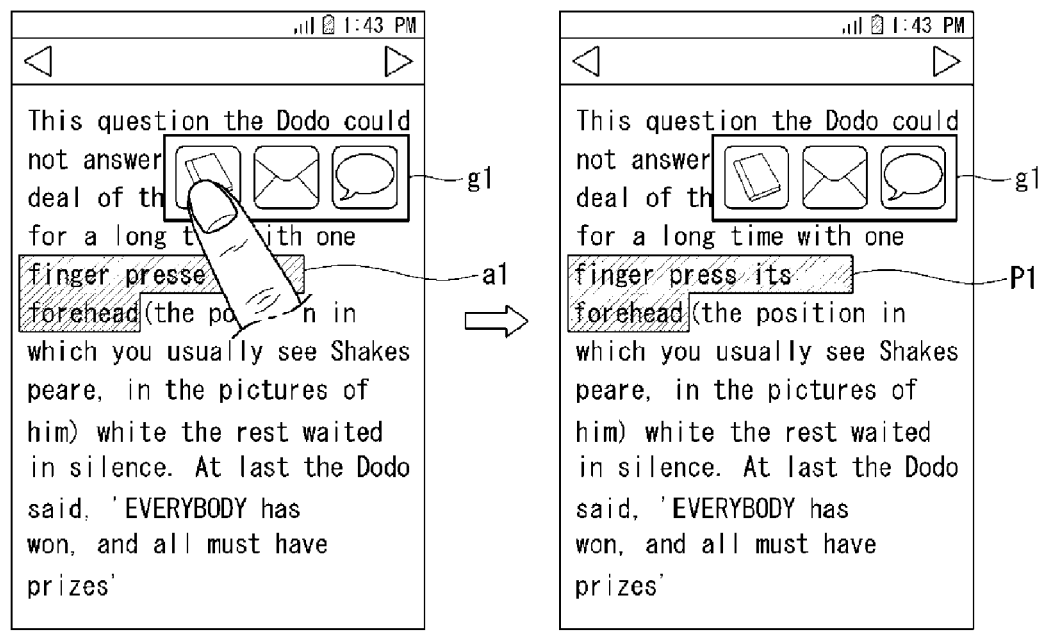
Figure 55:
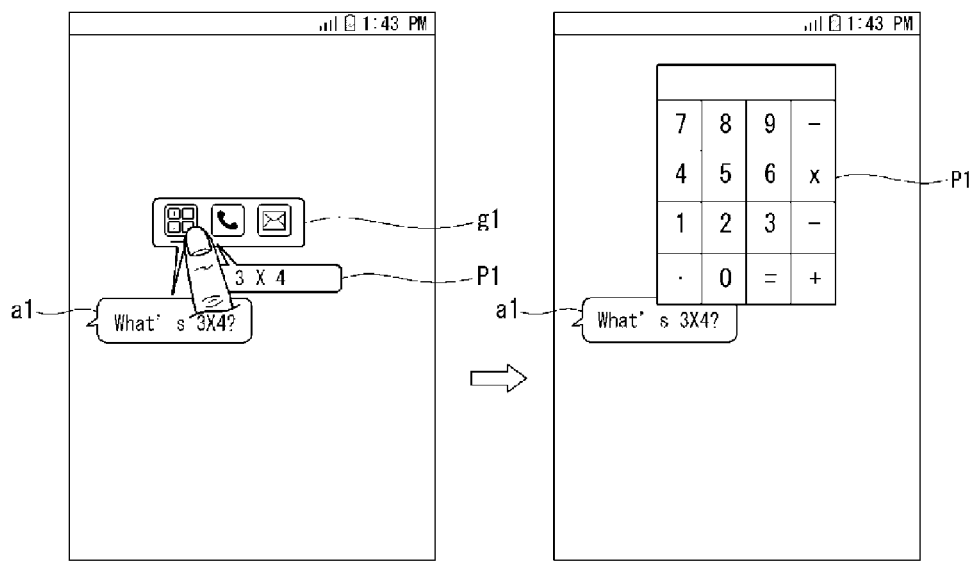

Referring to FIGS. 53 through 55, in a case in which a specific application is executed according to a behavior guide g2, the controller 180 may display the executed screen P1 as a floating screen on a currently edited screen in an overlapping manner (P1).

In the case in which the executed screen P1 is displayed as a floating screen on the currently edited screen in an overlapping manner, the controller 180 may display a screen (please refer to FIGS. 53 and 54) in which only the execution result P1 is simply displayed or display the executed screen P1 in an upper portion of a selected object in an overlapping manner.

In the case in which the executed screen P1 as a floating screen on the currently edited screen in an overlapping manner, the controller 180 may reduce the executed screen of the specific application to display it (please refer to FIG. 55) or may provide only brief information in a preview screen.

Figure 56:
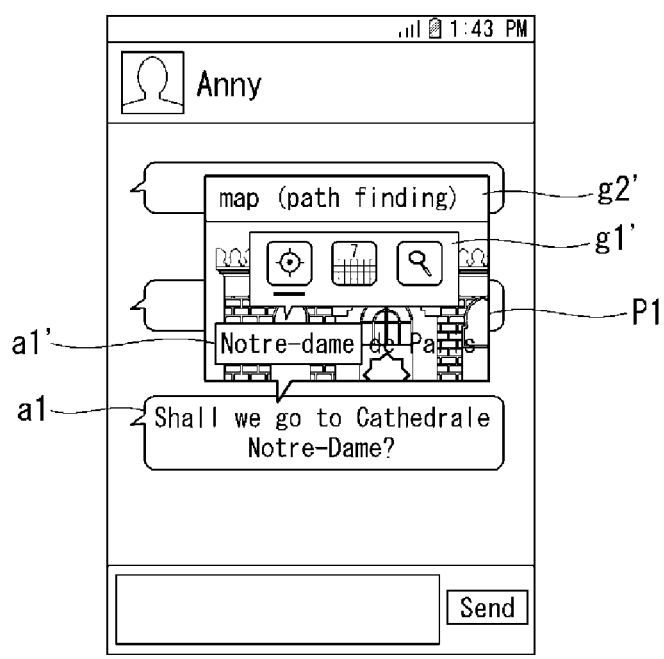
FIGS. 56 through 58 are views illustrating additional functions of a control method of a mobile terminal related to an embodiment of the present disclosure.
Figure 57:
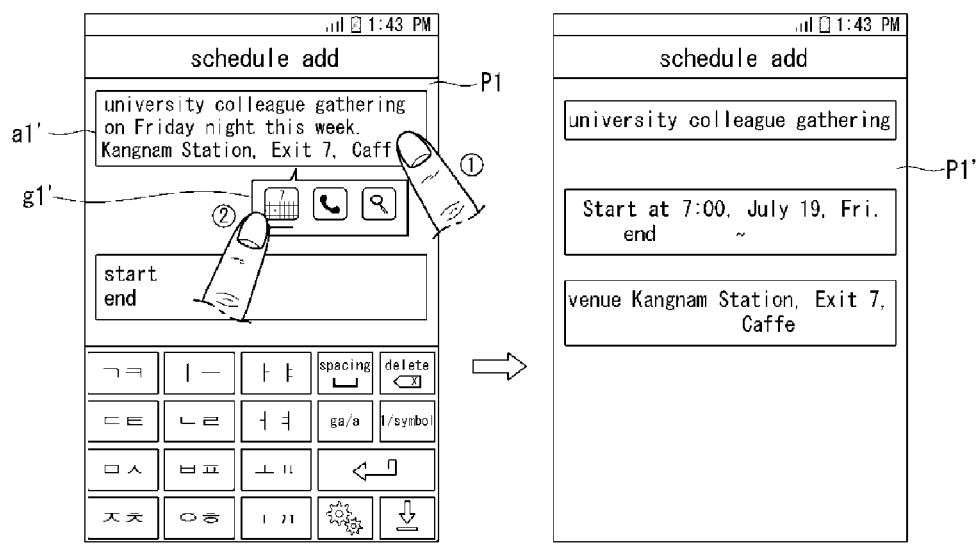
Figure 58:
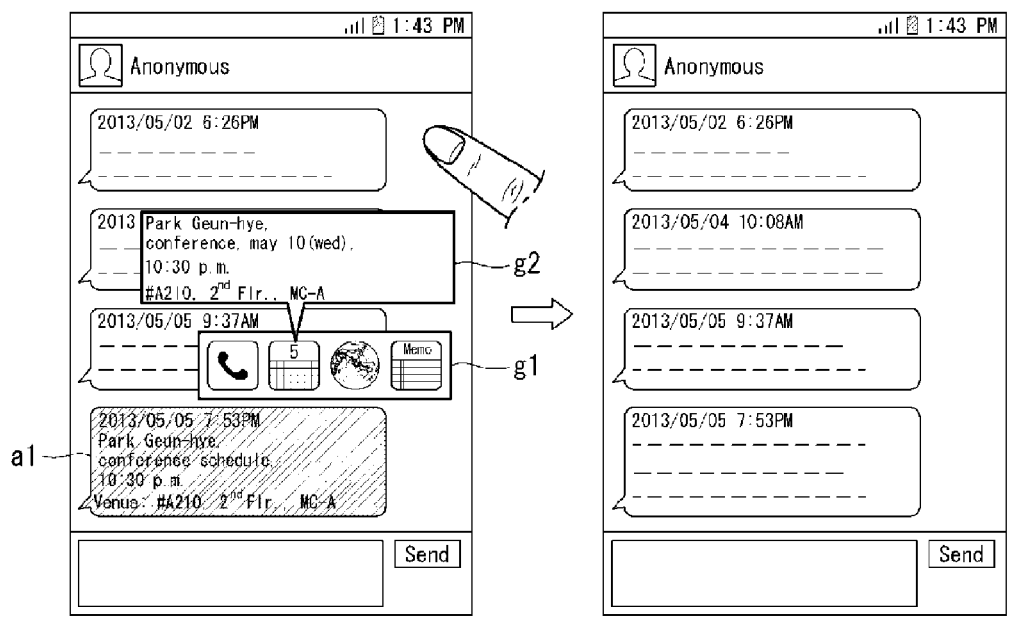

FIGS. 56 through 58 are views illustrating additional functions of a control method of a mobile terminal related to an embodiment of the present disclosure.

Referring to FIG. 56, the controller 180 may select an object displayed in the executed screen P1 of a first specific application associated with a first selected object a1, as a second selected object a1'.

The controller 180 may provide at least one application associated with the second selected object a1' in a pop-up window g1', and select a second specific application (map application).

Namely, the controller 180 may select a different object displayed on the executed screen of the application associated with the selected object again, and recommend execution of the associated application.

Referring to FIG. 57, the controller 180 may detect selection (0) of an object a1' displayed in the executed screen P1 of the first specific application, and recommend at least one application associated with the selected object a1' in a pop-up window g1'.

Also, the controller 180 may execute the selected object a1' and display an executed screen P1' of a second specific application among the at least one recommended application. In this case, the first specific application and the second specific application may be identical.

In a case in which the selected object is converted into a form appropriate for an input item of the calendar application and input but the input result is not satisfactory, the user may select an object displayed in the input item of the calendar application again, reconvert the selected object according to each input item of the calendar application, and display the same in each input item.

Referring to FIG. 58, the controller 180 may release object selection. In a state in which the first pop-up window g1 and the second pop-up window g2 are displayed, when a touch input applied to a region in which the first pop-up window g1 and the second pop-up window g2 are not displayed is received, the controller 180 may release displaying of the first pop-up window g1 and the second pop-up window g2.

Also, even in a case in which only one of the first pop-up window g1 or the second pop-up window g2 is displayed, when a touch input applied to a region in which the pop-up window g1 or g2 is not displayed is received, the controller 180 may release displaying of the pop-up window.

When the displaying of the first pop-up window g1 and the second pop-up window g2 is released, the controller 180 may select an object displayed on the touch screen again.

Figure 59:
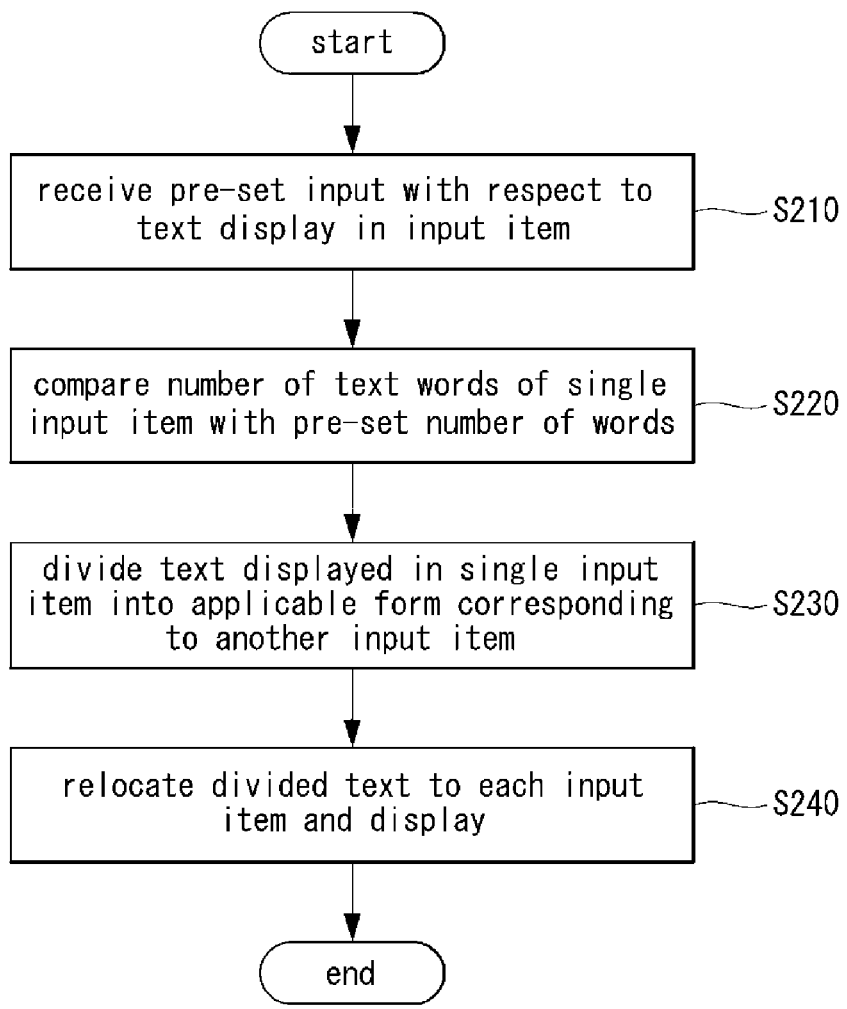
FIG. 59 is a flow chart illustrating a control method of a mobile terminal related to another embodiment of the present disclosure.
Figure 60:
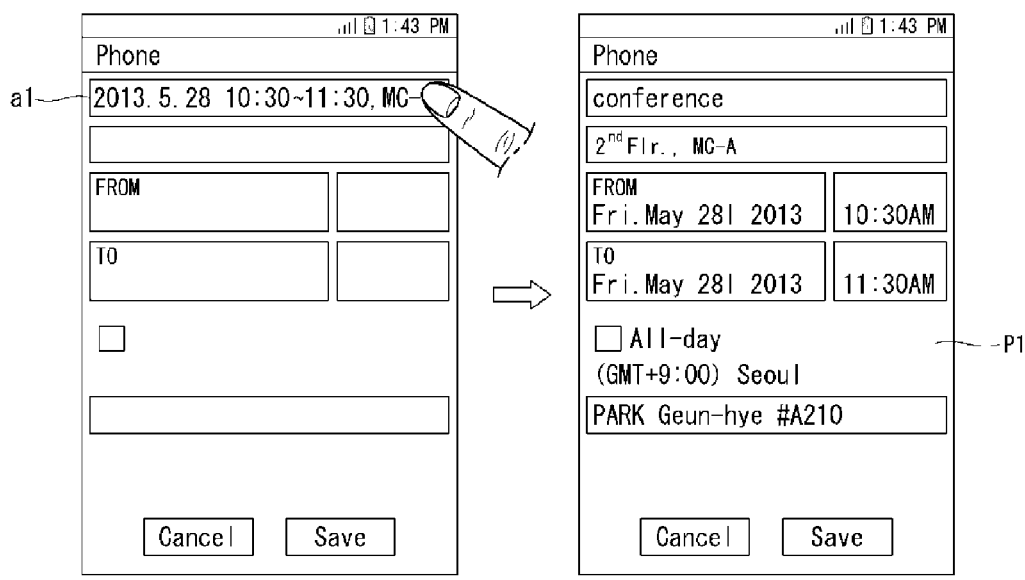
FIG. 60 is a view illustrating a control method of a mobile terminal related to another embodiment of the present disclosure.

FIG. 59 is a flow chart illustrating a control method of a mobile terminal related to another embodiment of the present disclosure, and FIG. 60 is a view illustrating a control method of a mobile terminal related to another embodiment of the present disclosure.

Referring to FIG. 59, the controller 180 may receive a pre-set input with respect to text displayed in an input item of a specific application through the touch screen (S210). In this case, the specific application may be a first executed application or an application associated with a selected object.

The controller 180 may compare the number of words of text displayed in at least one input item of the specific application with a pre-set number of words (S220). In a case in which the user inputs entire text to a single input item of the specific application, the controller 180 may need to divide the text displayed in the single input item and relocate the divided text to each input item.

In a case in which the number of words of the text displayed in a single input item exceeds the pre-set number of words, the controller 180 may divide the text displayed in the single input item into an applicable form corresponding to a different input item (S230), and relocate the divided text into each input item to display the same (S240).

The controller 180 may divide the text displayed in the single input item into time, date, venue, name, contact number, and title, and relocate the divided text into corresponding input items to display the same.

Referring to FIG. 60, while the calendar application is being executed, in a case in which text exceeding the pre-set number of words is input to an input item a1 for inputting a title, when an input applied to the region exceeding the pre-set number of words is received, the controller 180 may convert text displayed in the corresponding region into an applicable form of each input region, and subsequently dispose the text in each input item to display the same (P1). Here, the input items may be input fields for an application, such as a phone, calendar, contacts, or another appropriate type of application having input fields.

According to an embodiment of the present disclosure, the mobile terminal may predict a subsequent user behavior based on a user behavior of selecting an object, and provide a behavior guide to minimize a process of directly inputting an object by the user.

Also, according to an embodiment of the present disclosure, the mobile terminal may execute functions such as providing selecting an object in a cascade manner, recommending an application associated with a selected object, and providing a user behavior guide, even on a resultant screen on which Smart Link has been performed.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touch screen to display at least one object; and
a controller configured to generate an input for an application based on selection of the at least one object on the touch screen, wherein
a prescribed input to select one of the at least one object is detected on the touch screen,
the controller determines whether at least one application is associated with the selected object,
a pop-up window that includes a plurality of icons for different applications associated with the selected object is displayed on the touch screen, and
when an icon for one of the applications is selected, the selected object is converted into a format corresponding to the selected application,
wherein the pop-up window including the plurality of icons for the applications associated with the selected object is displayed adjacent to the selected object on the touch screen in response to a user input.

2. The mobile terminal of claim 1, wherein the selected object is a text displayed on the touch screen and the converted object is the input generated for the selected application using the text.

3. The mobile terminal of claim 2, wherein the controller compares a number of words of the text with a prescribed number of words,
divides the text to convert the text into a plurality of text inputs when the number of words of the text exceeds the prescribed number of words, and
inputs each of the divided text inputs into a corresponding input field in the selected application.

4. The mobile terminal of claim 1, wherein when the object is selected, the controller displays a prescribed indicator or a prescribed menu, and when the prescribed indicator or the prescribed menu is selected, the controller displays the icon for each application associated with the selected object.

5. The mobile terminal of claim 1, wherein when an input with respect to the selected application is released and an input with respect to a second application is received, the controller converts the selected object in a format corresponding to the second application and displays the converted object for the second application on the touch screen.

6. The mobile terminal of claim 1, wherein the prescribed input includes a touch input or a drag input applied to the displayed object, a long-touch input applied to a region including the displayed object, or a continuous touch input having a curve shape surrounding the displayed object, and wherein the prescribed input is a direct touch input or a proximity touch input applied to the touch screen.

7. The mobile terminal of claim 1, wherein when the input with respect to the selected application is received, the controller displays an application screen for the selected application in a floating window provided in a region of the touch screen corresponding to the selected object in an overlapping manner.

8. The mobile terminal of claim 1, wherein when the input with respect to the selected application is received, the controller displays an application screen for the selected application as a full screen.

9. The mobile terminal of claim 1, wherein the at least one object displayed on the touch screen includes at least one of a text, an image or a video, and when the displayed object is an image, the selected object includes a selected portion of the image and meta data with respect to the selected image.

10. The mobile terminal of claim 1, wherein when an input with respect to the converted object is received, the controller switches to an editing mode to edit the converted object.

11. The mobile terminal of claim 1, wherein the at least one application associated with the selected object includes an application designated by a user.

12. The mobile terminal of claim 1, wherein the controller classifies the selected object into a type of information including at least one of time, venue, name, contact number, number, date, or a prescribed word, and recommends an application associated with the selected object by using the classified type of information.

13. The mobile terminal of claim 1, wherein when a length of the converted object exceeds a prescribed reference value, the controller reconverts the converted object into a format having a length within the reference value.

14. The mobile terminal of claim 1, wherein the controller displays a graphical user interface to set a user preference related to the selected application and the converted object.

15. A mobile terminal comprising:
a touch screen; and
a controller configured to control an input to a prescribed application displayed on the touch screen, wherein
a prescribed input to select an object is detected on the touch screen,
the controller determines whether at least one application is associated with the selected object,
a pop-up window that includes a plurality of icons for different applications associated with the selected object is displayed on the touch screen,
an application screen for the prescribed application among the at least one application associated with the selected object is displayed, the application screen having a first input field and at least one second input field,
a text input is displayed in the first input field,
a number of words in the text input displayed in the first input field of the prescribed application is compared with a pre-set number of words,
the text input displayed in the first input field is divided into a plurality of text inputs having a format corresponding to the first input field and at least one second input field when the number of words of the text input displayed in the first input item exceeds the pre-set number of words, and
the divided text inputs are input to each of the first and the second input fields displayed on the touch screen.

16. The mobile terminal of claim 15, wherein the controller divides the text input displayed in the first input field according to a type of information including at least one of time, date, venue, name, contact number, or a title, and inputs the divided text in the corresponding input field based on the type of information.

17. A method of controlling a mobile terminal, the method comprising:
displaying an object on a touch screen;
selecting the displayed object upon receiving a prescribed input with respect to the displayed object;
displaying a pop-up window that includes a plurality of icons for different applications associated with the selected object,
converting the selected object into an applicable form corresponding to a prescribed application upon receiving an input with respect to the prescribed application among the plurality of icons for applications; and
displaying the pop-up window including the plurality of icons for the applications associated with the selected object adjacent to the selected object on the touch screen in response to a user input.

18. A method of controlling a mobile terminal, the method comprising:
displaying an object on a touch screen;
selecting the displayed object upon receiving a prescribed input with respect to the displayed object;
displaying a pop-up window that includes a plurality of icons for different applications associated with the selected object,
displaying an application screen for a prescribed application among the applications associated with the selected object, the application screen having a first input field and at least one second input field,
displaying, by the mobile terminal, a text input in the first input field;
comparing, by the mobile terminal, a number of words in the text input displayed in the first input field of the prescribed application with a pre-set number of words;

when the number of words in the text input displayed in the first input field exceeds the pre-set number of words, dividing, by the mobile terminal, the text input displayed in the first input field into a plurality of text inputs having a format corresponding to the first input field and at least one second input field; and inputting, by the mobile terminal, the divided text inputs to each of the first and the second input fields displayed on the touch screen.

19. The mobile terminal of claim 1, wherein the controller determines whether at least one application is associated with the selected object based on a context of text included in the selected object.

\* \* \* \* \*